(12) United States Patent
Khlat

(10) Patent No.: US 9,250,643 B2
(45) Date of Patent: Feb. 2, 2016

(54) USING A SWITCHING SIGNAL DELAY TO REDUCE NOISE FROM A SWITCHING POWER SUPPLY

(71) Applicant: RF Micro Devices, Inc., Greensboro, NC (US)

(72) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 399 days.

(21) Appl. No.: 13/689,940

(22) Filed: Nov. 30, 2012

(65) Prior Publication Data

US 2013/0134956 A1     May 30, 2013

Related U.S. Application Data

(60) Provisional application No. 61/565,092, filed on Nov. 30, 2011.

(51) Int. Cl.
*H02M 3/335*     (2006.01)
*G05F 3/02*       (2006.01)
*H02M 3/156*     (2006.01)
(Continued)

(52) U.S. Cl.
CPC .................. *G05F 3/02* (2013.01); *H02M 1/143* (2013.01); *H02M 3/156* (2013.01); *H02M 2003/1586* (2013.01)

(58) Field of Classification Search
CPC .................... H02M 2001/0045; H02M 3/156; H02M 3/158; H02M 1/14; H02M 1/143; H02M 1/15; H03F 1/0227; H03F 1/025; H03F 3/602; H03F 2200/451; H03F 3/00; H03F 3/217
See application file for complete search history.

(56) References Cited

U.S. PATENT DOCUMENTS 3,969,682 A    7/1976  Rossum
3,980,964 A    9/1976  Grodinsky
(Continued)

FOREIGN PATENT DOCUMENTS

CN      1211355 A    3/1999
CN      1518209 A    8/2004
(Continued)

OTHER PUBLICATIONS

Notice of Allowance for U.S. Appl. No. 13/188,024, mailed Jun. 18, 2013, 7 pages.
(Continued)

*Primary Examiner* — Harry Behm
*Assistant Examiner* — Peter Novak
(74) *Attorney, Agent, or Firm* — Withrow & Terranova, P.L.L.C.

(57) ABSTRACT

Embodiments of circuitry, which includes power supply switching circuitry, a first inductive element, and a second inductive element, are disclosed. The power supply switching circuitry provides a first switching output signal to the first inductive element and a second switching output signal to the second inductive element. The first inductive element has a first inductor current and the second inductive element has a second inductor current. The second switching output signal is delayed from the first switching output signal by a switching signal delay. The first inductor current and the second inductor current combine to provide a combined inductor current, which has a frequency response with a group of notches, such that frequency locations of the group of notches are based on the switching signal delay.

27 Claims, 15 Drawing Sheets

(51) Int. Cl.
*H02M 1/14* (2006.01)
*H02M 3/158* (2006.01)

(56) References Cited

U.S. PATENT DOCUMENTS

| | | |
|---|---|---|
| 4,587,552 A | 5/1986 | Chin |
| 4,692,889 A | 9/1987 | McNeely |
| 4,831,258 A | 5/1989 | Paulk et al. |
| 4,996,500 A | 2/1991 | Larson et al. |
| 5,099,203 A | 3/1992 | Weaver et al. |
| 5,146,504 A | 9/1992 | Pinckley |
| 5,187,396 A | 2/1993 | Armstrong, II et al. |
| 5,311,309 A | 5/1994 | Ersoz et al. |
| 5,317,217 A | 5/1994 | Rieger et al. |
| 5,351,087 A | 9/1994 | Christopher et al. |
| 5,414,614 A | 5/1995 | Fette et al. |
| 5,420,643 A | 5/1995 | Romesburg et al. |
| 5,457,620 A | 10/1995 | Dromgoole |
| 5,486,871 A | 1/1996 | Filliman et al. |
| 5,532,916 A | 7/1996 | Tamagawa |
| 5,541,547 A | 7/1996 | Lam |
| 5,581,454 A | 12/1996 | Collins |
| 5,646,621 A | 7/1997 | Cabler et al. |
| 5,715,526 A | 2/1998 | Weaver, Jr. et al. |
| 5,767,744 A | 6/1998 | Irwin et al. |
| 5,822,318 A | 10/1998 | Tiedmann, Jr. et al. |
| 5,898,342 A | 4/1999 | Bell |
| 5,905,407 A | 5/1999 | Midya |
| 5,936,464 A | 8/1999 | Grondahl |
| 6,043,610 A | 3/2000 | Buell |
| 6,043,707 A | 3/2000 | Budnik |
| 6,055,168 A | 4/2000 | Kotowski et al. |
| 6,070,181 A | 5/2000 | Yeh |
| 6,118,343 A | 9/2000 | Winslow |
| 6,133,777 A | 10/2000 | Savelli |
| 6,141,541 A | 10/2000 | Midya et al. |
| 6,147,478 A | 11/2000 | Skelton et al. |
| 6,166,598 A | 12/2000 | Schlueter |
| 6,198,645 B1 | 3/2001 | Kotowski et al. |
| 6,204,731 B1 | 3/2001 | Jiang et al. |
| 6,256,482 B1 | 7/2001 | Raab |
| 6,300,826 B1 | 10/2001 | Mathe et al. |
| 6,313,681 B1 | 11/2001 | Yoshikawa |
| 6,348,780 B1 | 2/2002 | Grant |
| 6,400,775 B1 | 6/2002 | Gourgue et al. |
| 6,483,281 B2 | 11/2002 | Hwang |
| 6,559,689 B1 | 5/2003 | Clark |
| 6,566,935 B1 | 5/2003 | Renous |
| 6,583,610 B2 | 6/2003 | Groom et al. |
| 6,617,930 B2 | 9/2003 | Nitta |
| 6,621,808 B1 | 9/2003 | Sadri |
| 6,624,712 B1 | 9/2003 | Cygan et al. |
| 6,658,445 B1 | 12/2003 | Gau et al. |
| 6,681,101 B1 | 1/2004 | Eidson et al. |
| 6,690,652 B1 | 2/2004 | Sadri |
| 6,701,141 B2 | 3/2004 | Lam |
| 6,703,080 B2 | 3/2004 | Reyzelman et al. |
| 6,728,163 B2 | 4/2004 | Gomm et al. |
| 6,744,151 B2 | 6/2004 | Jackson et al. |
| 6,819,938 B2 | 11/2004 | Sahota |
| 6,885,176 B2 | 4/2005 | Librizzi |
| 6,958,596 B1 | 10/2005 | Sferrazza et al. |
| 6,995,995 B2 | 2/2006 | Zeng et al. |
| 7,038,536 B2 | 5/2006 | Cioffi et al. |
| 7,043,213 B2 | 5/2006 | Robinson et al. |
| 7,053,718 B2 | 5/2006 | Dupuis et al. |
| 7,058,373 B2 | 6/2006 | Grigore |
| 7,099,635 B2 | 8/2006 | McCune |
| 7,170,341 B2 | 1/2007 | Conrad et al. |
| 7,200,365 B2 | 4/2007 | Watanabe et al. |
| 7,233,130 B1 | 6/2007 | Kay |
| 7,253,589 B1 | 8/2007 | Potanin et al. |
| 7,254,157 B1 | 8/2007 | Crotty et al. |
| 7,262,658 B2 | 8/2007 | Ramaswamy et al. |
| 7,279,875 B2 | 10/2007 | Gan et al. |
| 7,304,537 B2 | 12/2007 | Kwon et al. |
| 7,348,847 B2 | 3/2008 | Whittaker |
| 7,394,233 B1 | 7/2008 | Trayling et al. |
| 7,405,618 B2 | 7/2008 | Lee et al. |
| 7,411,316 B2 | 8/2008 | Pai |
| 7,414,330 B2 | 8/2008 | Chen |
| 7,454,238 B2 | 11/2008 | Vinayak et al. |
| 7,515,885 B2 | 4/2009 | Sander et al. |
| 7,528,807 B2 | 5/2009 | Kim et al. |
| 7,529,523 B1 | 5/2009 | Young et al. |
| 7,539,466 B2 | 5/2009 | Tan et al. |
| 7,595,569 B2 | 9/2009 | Amerom et al. |
| 7,609,114 B2 | 10/2009 | Hsieh et al. |
| 7,615,979 B2 | 11/2009 | Caldwell |
| 7,627,622 B2 | 12/2009 | Conrad et al. |
| 7,646,108 B2 | 1/2010 | Paillet et al. |
| 7,653,366 B2 | 1/2010 | Grigore |
| 7,679,433 B1 | 3/2010 | Li |
| 7,684,216 B2 | 3/2010 | Choi et al. |
| 7,696,735 B2 | 4/2010 | Oraw et al. |
| 7,715,811 B2 | 5/2010 | Kenington |
| 7,724,837 B2 | 5/2010 | Filimonov et al. |
| 7,755,431 B2 | 7/2010 | Sun |
| 7,764,060 B2 | 7/2010 | Wilson |
| 7,773,691 B2 | 8/2010 | Khlat et al. |
| 7,773,965 B1 | 8/2010 | Van Brunt et al. |
| 7,777,459 B2 | 8/2010 | Williams |
| 7,782,036 B1 | 8/2010 | Wong et al. |
| 7,783,269 B2 | 8/2010 | Vinayak et al. |
| 7,800,427 B2 | 9/2010 | Chae et al. |
| 7,805,115 B1 | 9/2010 | McMorrow et al. |
| 7,852,150 B1 | 12/2010 | Arknaes-Pedersen |
| 7,856,048 B1 | 12/2010 | Smaini et al. |
| 7,859,336 B2 | 12/2010 | Markowski et al. |
| 7,880,547 B2 | 2/2011 | Lee et al. |
| 7,884,681 B1 | 2/2011 | Khlat et al. |
| 7,894,216 B2 | 2/2011 | Melanson |
| 7,898,268 B2 | 3/2011 | Bernardon et al. |
| 7,898,327 B2 | 3/2011 | Nentwig |
| 7,907,010 B2 | 3/2011 | Wendt et al. |
| 7,915,961 B1 | 3/2011 | Li |
| 7,920,023 B2 | 4/2011 | Witchard |
| 7,923,974 B2 | 4/2011 | Martin et al. |
| 7,965,140 B2 | 6/2011 | Takahashi |
| 7,994,864 B2 | 8/2011 | Chen et al. |
| 8,000,117 B2 | 8/2011 | Petricek |
| 8,008,970 B1 | 8/2011 | Homol et al. |
| 8,022,761 B2 | 9/2011 | Drogi et al. |
| 8,026,765 B2 | 9/2011 | Giovannotto |
| 8,044,639 B2 | 10/2011 | Tamegai et al. |
| 8,054,126 B2 | 11/2011 | Yang et al. |
| 8,068,622 B2 | 11/2011 | Melanson et al. |
| 8,081,199 B2 | 12/2011 | Takata et al. |
| 8,093,951 B1 | 1/2012 | Zhang et al. |
| 8,159,297 B2 | 4/2012 | Kumagai |
| 8,164,388 B2 | 4/2012 | Iwamatsu |
| 8,174,313 B2 | 5/2012 | Vice |
| 8,183,917 B2 | 5/2012 | Drogi et al. |
| 8,183,929 B2 | 5/2012 | Grondahl |
| 8,198,941 B2 | 6/2012 | Lesso |
| 8,204,456 B2 | 6/2012 | Xu et al. |
| 8,242,813 B1 | 8/2012 | Wile et al. |
| 8,253,485 B2 | 8/2012 | Clifton |
| 8,253,487 B2 | 8/2012 | Hou et al. |
| 8,274,332 B2 | 9/2012 | Cho et al. |
| 8,289,084 B2 | 10/2012 | Morimoto et al. |
| 8,362,837 B2 | 1/2013 | Koren et al. |
| 8,493,141 B2 | 7/2013 | Khlat et al. |
| 8,519,788 B2 | 8/2013 | Khlat |
| 8,541,993 B2 | 9/2013 | Notman et al. |
| 8,542,061 B2 | 9/2013 | Levesque et al. |
| 8,548,398 B2 | 10/2013 | Baxter et al. |
| 8,558,616 B2 | 10/2013 | Shizawa et al. |
| 8,571,498 B2 | 10/2013 | Khlat |
| 8,588,713 B2 | 11/2013 | Khlat |
| 8,611,402 B2 | 12/2013 | Chiron |
| 8,618,868 B2 | 12/2013 | Khlat et al. |
| 8,624,576 B2 | 1/2014 | Khlat et al. |
| 8,624,760 B2 | 1/2014 | Ngo et al. |

(56) References Cited

U.S. PATENT DOCUMENTS

| | | |
|---|---|---|
| 8,626,091 B2 | 1/2014 | Khlat et al. |
| 8,633,766 B2 | 1/2014 | Khlat et al. |
| 8,638,165 B2 | 1/2014 | Shah et al. |
| 8,648,657 B1 | 2/2014 | Rozenblit |
| 8,659,355 B2 | 2/2014 | Henshaw et al. |
| 8,693,676 B2 | 4/2014 | Xiao et al. |
| 8,717,100 B2 | 5/2014 | Reisner et al. |
| 8,718,579 B2 | 5/2014 | Drogi |
| 8,718,582 B2 | 5/2014 | See et al. |
| 8,725,218 B2 | 5/2014 | Brown et al. |
| 8,744,382 B2 | 6/2014 | Hou et al. |
| 8,749,307 B2 | 6/2014 | Zhu et al. |
| 8,760,228 B2 | 6/2014 | Khlat |
| 8,782,107 B2 | 7/2014 | Myara et al. |
| 8,792,840 B2 | 7/2014 | Khlat et al. |
| 8,803,605 B2 | 8/2014 | Fowers et al. |
| 8,824,978 B2 | 9/2014 | Briffa et al. |
| 8,829,993 B2 | 9/2014 | Briffa et al. |
| 8,878,606 B2 | 11/2014 | Khlat et al. |
| 8,884,696 B2 | 11/2014 | Langer |
| 8,909,175 B1 | 12/2014 | McCallister |
| 8,942,313 B2 | 1/2015 | Khlat et al. |
| 8,942,651 B2 | 1/2015 | Jones |
| 8,942,652 B2 | 1/2015 | Khlat et al. |
| 8,947,161 B2 | 2/2015 | Khlat et al. |
| 8,947,162 B2 | 2/2015 | Wimpenny et al. |
| 8,952,710 B2 | 2/2015 | Retz et al. |
| 8,957,728 B2 | 2/2015 | Gorisse |
| 8,975,959 B2 | 3/2015 | Khlat |
| 8,981,839 B2 | 3/2015 | Kay et al. |
| 8,981,847 B2 | 3/2015 | Balteanu |
| 8,981,848 B2 | 3/2015 | Kay et al. |
| 8,994,345 B2 | 3/2015 | Wilson |
| 9,019,011 B2 | 4/2015 | Hietala et al. |
| 9,020,451 B2 | 4/2015 | Khlat |
| 9,024,688 B2 | 5/2015 | Kay et al. |
| 9,041,364 B2 | 5/2015 | Khlat |
| 9,041,365 B2 | 5/2015 | Kay et al. |
| 9,075,673 B2 | 7/2015 | Khlat et al. |
| 9,077,405 B2 | 7/2015 | Jones et al. |
| 9,099,961 B2 | 8/2015 | Kay et al. |
| 9,112,452 B1 | 8/2015 | Khlat |
| 2002/0071497 A1 | 6/2002 | Bengtsson et al. |
| 2003/0031271 A1 | 2/2003 | Bozeki et al. |
| 2003/0062950 A1 | 4/2003 | Hamada et al. |
| 2003/0137286 A1 | 7/2003 | Kimball et al. |
| 2003/0146791 A1 | 8/2003 | Shvarts et al. |
| 2003/0153289 A1 | 8/2003 | Hughes et al. |
| 2003/0198063 A1 | 10/2003 | Smyth |
| 2003/0206603 A1 | 11/2003 | Husted |
| 2003/0220953 A1 | 11/2003 | Allred |
| 2003/0232622 A1 | 12/2003 | Seo et al. |
| 2004/0047329 A1 | 3/2004 | Zheng |
| 2004/0051384 A1 | 3/2004 | Jackson et al. |
| 2004/0124913 A1 | 7/2004 | Midya et al. |
| 2004/0127173 A1 | 7/2004 | Leizerovich |
| 2004/0132424 A1 | 7/2004 | Aytur et al. |
| 2004/0184569 A1 | 9/2004 | Challa et al. |
| 2004/0196095 A1 | 10/2004 | Nonaka |
| 2004/0219891 A1 | 11/2004 | Hadjichristos |
| 2004/0239301 A1 | 12/2004 | Kobayashi |
| 2004/0266366 A1 | 12/2004 | Robinson et al. |
| 2004/0267842 A1 | 12/2004 | Allred |
| 2005/0008093 A1 | 1/2005 | Matsuura et al. |
| 2005/0032499 A1 | 2/2005 | Cho |
| 2005/0047180 A1 | 3/2005 | Kim |
| 2005/0064830 A1 | 3/2005 | Grigore |
| 2005/0079835 A1 | 4/2005 | Takabayashi et al. |
| 2005/0093630 A1 | 5/2005 | Whittaker et al. |
| 2005/0110562 A1 | 5/2005 | Robinson et al. |
| 2005/0122171 A1 | 6/2005 | Miki et al. |
| 2005/0156582 A1 | 7/2005 | Redl et al. |
| 2005/0156662 A1 | 7/2005 | Raghupathy et al. |
| 2005/0157778 A1 | 7/2005 | Trachewsky et al. |
| 2005/0200407 A1 | 9/2005 | Arai et al. |
| 2005/0286616 A1 | 12/2005 | Kodavati |
| 2006/0006946 A1 | 1/2006 | Burns et al. |
| 2006/0062324 A1 | 3/2006 | Naito et al. |
| 2006/0097711 A1 | 5/2006 | Brandt |
| 2006/0128324 A1 | 6/2006 | Tan et al. |
| 2006/0147062 A1 | 7/2006 | Niwa et al. |
| 2006/0154637 A1 | 7/2006 | Eyries et al. |
| 2006/0178119 A1 | 8/2006 | Jarvinen |
| 2006/0181340 A1 | 8/2006 | Dhuyvetter |
| 2006/0220627 A1 | 10/2006 | Koh |
| 2006/0244513 A1 | 11/2006 | Yen et al. |
| 2007/0008804 A1 | 1/2007 | Lu et al. |
| 2007/0014382 A1 | 1/2007 | Shakeshaft et al. |
| 2007/0024360 A1 | 2/2007 | Markowski |
| 2007/0024365 A1 | 2/2007 | Ramaswamy et al. |
| 2007/0063681 A1 | 3/2007 | Liu |
| 2007/0082622 A1 | 4/2007 | Leinonen et al. |
| 2007/0146076 A1 | 6/2007 | Baba |
| 2007/0159256 A1 | 7/2007 | Ishikawa et al. |
| 2007/0182392 A1 | 8/2007 | Nishida |
| 2007/0183532 A1 | 8/2007 | Matero |
| 2007/0184794 A1 | 8/2007 | Drogi et al. |
| 2007/0249304 A1 | 10/2007 | Snelgrove et al. |
| 2007/0259628 A1 | 11/2007 | Carmel et al. |
| 2007/0290749 A1 | 12/2007 | Woo et al. |
| 2008/0003950 A1 | 1/2008 | Haapoja et al. |
| 2008/0044041 A1 | 2/2008 | Tucker et al. |
| 2008/0081572 A1 | 4/2008 | Rofougaran |
| 2008/0104432 A1 | 5/2008 | Vinayak et al. |
| 2008/0150619 A1 | 6/2008 | Lesso et al. |
| 2008/0205095 A1 | 8/2008 | Pinon et al. |
| 2008/0224769 A1 | 9/2008 | Markowski et al. |
| 2008/0242246 A1 | 10/2008 | Minnis et al. |
| 2008/0252278 A1 | 10/2008 | Lindeberg et al. |
| 2008/0258831 A1 | 10/2008 | Kunihiro et al. |
| 2008/0259656 A1 | 10/2008 | Grant |
| 2008/0280577 A1 | 11/2008 | Beukema et al. |
| 2009/0004981 A1 | 1/2009 | Eliezer et al. |
| 2009/0045872 A1 | 2/2009 | Kenington |
| 2009/0082006 A1* | 3/2009 | Pozsgay et al. ............ 455/422.1 |
| 2009/0097591 A1 | 4/2009 | Kim |
| 2009/0160548 A1 | 6/2009 | Ishikawa et al. |
| 2009/0167260 A1 | 7/2009 | Pauritsch et al. |
| 2009/0174466 A1 | 7/2009 | Hsieh et al. |
| 2009/0184764 A1 | 7/2009 | Markowski et al. |
| 2009/0190699 A1 | 7/2009 | Kazakevich et al. |
| 2009/0191826 A1 | 7/2009 | Takinami et al. |
| 2009/0218995 A1 | 9/2009 | Ahn |
| 2009/0230934 A1 | 9/2009 | Hooijschuur et al. |
| 2009/0261908 A1 | 10/2009 | Markowski |
| 2009/0284235 A1 | 11/2009 | Weng et al. |
| 2009/0289720 A1 | 11/2009 | Takinami et al. |
| 2009/0319065 A1 | 12/2009 | Risbo |
| 2010/0001793 A1 | 1/2010 | Van Zeijl et al. |
| 2010/0002473 A1 | 1/2010 | Williams |
| 2010/0019749 A1 | 1/2010 | Katsuya et al. |
| 2010/0019840 A1 | 1/2010 | Takahashi |
| 2010/0026250 A1 | 2/2010 | Petty |
| 2010/0045247 A1 | 2/2010 | Blanken et al. |
| 2010/0171553 A1 | 7/2010 | Okubo et al. |
| 2010/0253309 A1 | 10/2010 | Xi et al. |
| 2010/0266066 A1 | 10/2010 | Takahashi |
| 2010/0289568 A1 | 11/2010 | Eschauzier et al. |
| 2010/0301947 A1 | 12/2010 | Fujioka et al. |
| 2010/0308654 A1 | 12/2010 | Chen |
| 2010/0311365 A1 | 12/2010 | Vinayak et al. |
| 2010/0321127 A1 | 12/2010 | Watanabe et al. |
| 2010/0327825 A1 | 12/2010 | Mehas et al. |
| 2010/0327971 A1 | 12/2010 | Kumagai |
| 2011/0018626 A1 | 1/2011 | Kojima |
| 2011/0058601 A1 | 3/2011 | Kim et al. |
| 2011/0084760 A1 | 4/2011 | Guo et al. |
| 2011/0109387 A1 | 5/2011 | Lee |
| 2011/0148375 A1 | 6/2011 | Tsuji |
| 2011/0234182 A1 | 9/2011 | Wilson |
| 2011/0235827 A1 | 9/2011 | Lesso et al. |
| 2011/0260706 A1 | 10/2011 | Nishijima |
| 2011/0279180 A1 | 11/2011 | Yamanouchi et al. |
| 2011/0298433 A1 | 12/2011 | Tam |

(56) References Cited

U.S. PATENT DOCUMENTS

| | | |
|---|---|---|
| 2011/0298539 A1 | 12/2011 | Drogi et al. |
| 2012/0025907 A1 | 2/2012 | Koo et al. |
| 2012/0025919 A1 | 2/2012 | Huynh |
| 2012/0034893 A1 | 2/2012 | Baxter et al. |
| 2012/0049894 A1* | 3/2012 | Berchtold et al. ............ 327/94 |
| 2012/0049953 A1 | 3/2012 | Khlat |
| 2012/0068767 A1 | 3/2012 | Henshaw et al. |
| 2012/0074916 A1 | 3/2012 | Trochut |
| 2012/0098595 A1 | 4/2012 | Stockert |
| 2012/0119813 A1 | 5/2012 | Khlat et al. |
| 2012/0133299 A1 | 5/2012 | Capodivacca et al. |
| 2012/0139516 A1 | 6/2012 | Tsai et al. |
| 2012/0154035 A1 | 6/2012 | Hongo et al. |
| 2012/0154054 A1 | 6/2012 | Kaczman et al. |
| 2012/0170334 A1 | 7/2012 | Menegoli et al. |
| 2012/0170690 A1 | 7/2012 | Ngo et al. |
| 2012/0176196 A1 | 7/2012 | Khlat |
| 2012/0194274 A1 | 8/2012 | Fowers et al. |
| 2012/0200354 A1 | 8/2012 | Ripley et al. |
| 2012/0236444 A1 | 9/2012 | Srivastava et al. |
| 2012/0244916 A1 | 9/2012 | Brown et al. |
| 2012/0269240 A1 | 10/2012 | Balteanu et al. |
| 2012/0299647 A1 | 11/2012 | Honjo et al. |
| 2012/0313701 A1 | 12/2012 | Khlat et al. |
| 2013/0024142 A1 | 1/2013 | Folkmann et al. |
| 2013/0034139 A1 | 2/2013 | Khlat et al. |
| 2013/0094553 A1 | 4/2013 | Paek et al. |
| 2013/0106378 A1 | 5/2013 | Khlat |
| 2013/0107769 A1 | 5/2013 | Khlat et al. |
| 2013/0135043 A1 | 5/2013 | Hietala et al. |
| 2013/0141064 A1 | 6/2013 | Kay et al. |
| 2013/0141068 A1 | 6/2013 | Kay et al. |
| 2013/0141072 A1 | 6/2013 | Khlat et al. |
| 2013/0141169 A1 | 6/2013 | Khlat et al. |
| 2013/0147445 A1 | 6/2013 | Levesque et al. |
| 2013/0154729 A1 | 6/2013 | Folkmann et al. |
| 2013/0169245 A1 | 7/2013 | Kay et al. |
| 2013/0181521 A1 | 7/2013 | Khlat |
| 2013/0214858 A1 | 8/2013 | Tournatory et al. |
| 2013/0229235 A1 | 9/2013 | Ohnishi |
| 2013/0238913 A1 | 9/2013 | Huang et al. |
| 2013/0271221 A1 | 10/2013 | Levesque et al. |
| 2013/0307617 A1 | 11/2013 | Khlat et al. |
| 2013/0328613 A1 | 12/2013 | Kay et al. |
| 2014/0009200 A1 | 1/2014 | Kay et al. |
| 2014/0009227 A1 | 1/2014 | Kay et al. |
| 2014/0028370 A1 | 1/2014 | Wimpenny |
| 2014/0028392 A1 | 1/2014 | Wimpenny |
| 2014/0049321 A1 | 2/2014 | Gebeyehu et al. |
| 2014/0055197 A1 | 2/2014 | Khlat et al. |
| 2014/0057684 A1 | 2/2014 | Khlat |
| 2014/0062590 A1 | 3/2014 | Khlat et al. |
| 2014/0077787 A1 | 3/2014 | Gorisse et al. |
| 2014/0097895 A1 | 4/2014 | Khlat et al. |
| 2014/0099906 A1 | 4/2014 | Khlat |
| 2014/0099907 A1 | 4/2014 | Chiron |
| 2014/0103995 A1 | 4/2014 | Langer |
| 2014/0111178 A1 | 4/2014 | Khlat et al. |
| 2014/0125408 A1 | 5/2014 | Kay et al. |
| 2014/0139199 A1 | 5/2014 | Khlat et al. |
| 2014/0184335 A1 | 7/2014 | Nobbe et al. |
| 2014/0203868 A1 | 7/2014 | Khlat et al. |
| 2014/0203869 A1 | 7/2014 | Khlat et al. |
| 2014/0225674 A1 | 8/2014 | Folkmann et al. |
| 2014/0266427 A1 | 9/2014 | Chiron |
| 2014/0266428 A1 | 9/2014 | Chiron et al. |
| 2014/0306769 A1 | 10/2014 | Khlat et al. |
| 2015/0048891 A1 | 2/2015 | Rozek et al. |
| 2015/0180422 A1 | 6/2015 | Khlat et al. |
| 2015/0234402 A1 | 8/2015 | Kay et al. |

FOREIGN PATENT DOCUMENTS

| | | |
|---|---|---|
| CN | 1898860 A | 1/2007 |
| CN | 101106357 A | 1/2008 |
| CN | 101201891 A | 6/2008 |
| CN | 101379695 A | 3/2009 |
| CN | 101405671 A | 4/2009 |
| CN | 101416385 A | 4/2009 |
| CN | 101427459 A | 5/2009 |
| CN | 101548476 A | 9/2009 |
| CN | 101626355 A | 1/2010 |
| CN | 101635697 A | 1/2010 |
| CN | 101669280 A | 3/2010 |
| CN | 101867284 A | 10/2010 |
| CN | 201674399 U | 12/2010 |
| EP | 0755121 A2 | 1/1997 |
| EP | 1047188 A2 | 10/2000 |
| EP | 1317105 A1 | 6/2003 |
| EP | 1492227 A1 | 12/2004 |
| EP | 1557955 A1 | 7/2005 |
| EP | 1569330 A1 | 8/2005 |
| EP | 2214304 A1 | 8/2010 |
| EP | 2244366 A1 | 10/2010 |
| EP | 2372904 A1 | 10/2011 |
| EP | 2579456 A1 | 4/2013 |
| GB | 2398648 A | 8/2004 |
| GB | 2462204 A | 2/2010 |
| GB | 2465552 A | 5/2010 |
| GB | 2484475 A | 4/2012 |
| TW | 461168 B | 10/2001 |
| WO | 0048306 A1 | 8/2000 |
| WO | 2004002006 A1 | 12/2003 |
| WO | 2004082135 A2 | 9/2004 |
| WO | 2005013084 A2 | 2/2005 |
| WO | 2006021774 A1 | 3/2006 |
| WO | 2006070319 A1 | 7/2006 |
| WO | 2006073208 A1 | 7/2006 |
| WO | 2007107919 A1 | 9/2007 |
| WO | 2007149346 A2 | 12/2007 |
| WO | 2012151594 A2 | 11/2012 |
| WO | 2012172544 A1 | 12/2012 |

OTHER PUBLICATIONS

International Preliminary Report on Patentability for PCT/US2011/054106 mailed Apr. 11, 2013, 8 pages.

International Preliminary Report on Patentability for PCT/US2011/061007 mailed May 30, 2013, 11 pages.

International Preliminary Report on Patentability for PCT/US2011/061009 mailed May 30, 2013, 10 pages.

Non-Final Office Action for U.S. Appl. No. 13/423,649, mailed May 22, 2013, 7 pages.

Advisory Action for U.S. Appl. No. 13/222,484, mailed Jun. 14, 2013, 3 pages.

International Preliminary Report on Patentability for PCT/US2011/064255, mailed Jun. 20, 2013, 7 pages.

Notice of Allowance for U.S. Appl. No. 13/343,840, mailed Jul. 1, 2013, 8 pages.

Notice of Allowance for U.S. Appl. No. 13/363,888, mailed Jul. 18, 2013, 9 pages.

Notice of Allowance for U.S. Appl. No. 13/222,453, mailed Aug. 22, 2013, 8 pages.

International Preliminary Report on Patentability for PCT/US2012/024124, mailed Aug. 22, 2013, 8 pages.

Notice of Allowance for U.S. Appl. No. 13/550,060, mailed Aug. 16, 2013, 8 pages.

Notice of Allowance for U.S. Appl. No. 13/222,484, mailed Aug. 26, 2013, 8 pages.

International Preliminary Report on Patentability for PCT/US2012/023495, mailed Aug. 15, 2013, 10 pages.

Choi, J. et al., "A New Power Management IC Architecture for Envelope Tracking Power Amplifier," IEEE Transactions on Microwave Theory and Techniques, vol. 59, No. 7, Jul. 2011, pp. 1796-1802.

(56) References Cited

OTHER PUBLICATIONS

Cidronali, A. et al., "A 240W Dual-Band 870 and 2140 MHz Envelope Tracking GaN PA Designed by a Probability Distribution Conscious Approach," IEEE MTT-S International Microwave Symposium Digest, Jun. 5-10, 2011, 4 pages.
Dixon, N., "Standardisation Boosts Momentum for Envelope Tracking," Microwave Engineering, Europe, Apr. 20, 2011, 2 pages, http://www.mwee.com/en/standardisation-boosts-momentum-for-envelope-tracking.html?cmp_ids=71&news_ids=222901746.
Hekkala, A. et al., "Adaptive Time Misalignment Compensation in Envelope Tracking Amplifiers," 2008 IEEE International Symposium on Spread Spectrum Techniques and Applications, Aug. 2008, pp. 761-765.
Kim et al., "High Efficiency and Wideband Envelope Tracking Power Amplifiers with Sweet Spot Tracking," 2010 IEEE Radio Frequency Integrated Circuits Symposium, May 23-25, 2010, pp. 255-258.
Kim, N. et al, "Ripple Feedback Filter Suitable for Analog/Digital Mixed-Mode Audio Amplifier for Improved Efficiency and Stability," 2002 IEEE Power Electronics Specialists Conference, vol. 1, Jun. 23, 2002, pp. 45-49.
Knutson, P, et al., "An Optimal Approach to Digital Raster Mapper Design," 1991 IEEE International Conference on Consumer Electronics held Jun. 5-7, 1991, vol. 37, Issue 4, published Nov. 1991, pp. 746-752.
Le, Hanh-Phuc et al., "A 32nm Fully Integrated Reconfigurable Switched-Capacitor DC-DC Convertor Delivering 0.55W/mm2 at 81% Efficiency," 2010 IEEE International Solid State Circuits Conference, Feb. 7-11, 2010, pp. 210-212.
Li, Y. et al., "A Highly Efficient SiGe Differential Power Amplifier Using an Envelope-Tracking Technique for 3GPP LTE Applications," 2010 IEEE Bipolar/BiCMOS Circuits and Technology Meeting (BCTM), Oct. 4-6, 2010, pp. 121-124.
Sahu, B. et al., "Adaptive Power Management of Linear RF Power Amplifiers in Mobile Handsets—An Integrated System Design Approach," submission for IEEE Asia Pacific Microwave Conference, Mar. 2004, 4 pages.
Unknown, "Nujira Files 100th Envelope Tracking Patent," CS: Compound Semiconductor, Apr. 11, 2011, 1 page, http://www.compoundsemiconductor.net/csc/news-details.php?cat=news&id=19733338&key=Nujira%20Files%20100th%20Envelope%20Tracking%20Patent&type=n.
Non-final Office Action for U.S. Appl. No. 11/113,873, now U.S. Pat. No. 7,773,691, mailed Feb. 1, 2008, 17 pages.
Final Office Action for U.S. Appl. No. 11/113,873, now U.S. Pat. No. 7,773,691, mailed Jul. 30, 2008, 19 pages.
Non-final Office Action for U.S. Appl. No. 11/113,873, now U.S. Pat. No. 7,773,691, mailed Nov. 26, 2008, 22 pages.
Final Office Action for U.S. Appl. No. 11/113,873, now U.S. Pat. No. 7,773,691, mailed May 4, 2009, 20 pages.
Non-final Office Action for U.S. Appl. No. 11/113,873, now U.S. Pat. No. 7,773,691, mailed Feb. 3, 2010, 21 pages.
Notice of Allowance for U.S. Appl. No. 11/113,873, now U.S. Pat. No. 7,773,691, mailed Jun. 9, 2010, 7 pages.
International Search Report for PCT/US06/12619 mailed May 8, 2007, 2 pages.
Extended European Search Report for application 06740532.4 mailed Dec. 7, 2010, 7 pages.
Non-final Office Action for U.S. Appl. No. 12/112,006 mailed Apr. 5, 2010, 6 pages.
Notice of Allowance for U.S. Appl. No. 12/112,006 mailed Jul. 19, 2010, 6 pages.
Non-final Office Action for U.S. Appl. No. 13/089,917 mailed Nov. 23, 2012, 6 pages.
International Search Report for PCT/US11/033037, mailed Aug. 9, 2011, 10 pages.
International Preliminary Report on Patentability for PCT/US2011/033037 mailed Oct. 23, 2012, 7 pages.
Non-Final Office Action for U.S. Appl. No. 13/188,024, mailed Feb. 5, 2013, 8 pages.
International Search Report for PCT/US2011/044857, mailed Oct. 24, 2011, 10 pages.
International Preliminary Report on Patentability for PCT/US2011/044857 mailed Mar. 7, 2013, 6 pages.
Non-final Office Action for U.S. Appl. No. 13/218,400 mailed Nov. 8, 2012, 7 pages.
Notice of Allowance for U.S. Appl. No. 13/218,400 mailed Apr. 11, 2013, 7 pages.
International Search Report for PCT/US11/49243, mailed Dec. 22, 2011, 9 pages.
International Preliminary Report on Patentability for PCT/US11/49243 mailed Nov. 13, 2012, 33 pages.
International Search Report for PCT/US2011/054106 mailed Feb. 9, 2012, 11 pages.
International Search Report for PCT/US2011/061007 mailed Aug. 16, 2012, 16 pages.
Non-Final Office Action for U.S. Appl. No. 13/297,470 mailed May 8, 2013, 15 pages.
International Search Report for PCT/US2011/061009 mailed Feb. 8, 2012, 14 pages.
International Search Report for PCT/US2012/023495 mailed May 7, 2012, 13 pages.
Non-final Office Action for U.S. Appl. No. 13/222,453 mailed Dec. 6, 2012, 13 pages.
Notice of Allowance for U.S. Appl. No. 13/222,453 mailed Feb. 21, 2013, 7 pages.
Invitation to Pay Additional Fees and Where Applicable Protest Fee for PCT/US2012/024124 mailed Jun. 1, 2012, 7 pages.
International Search Report for PCT/US2012/024124 mailed Aug. 24, 2012, 14 pages.
Notice of Allowance for U.S. Appl. No. 13/316,229 mailed Nov. 14, 2012, 9 pages.
International Search Report for PCT/US2011/064255 mailed Apr. 3, 2012, 12 pages.
International Search Report for PCT/US2012/40317 mailed Sep. 7, 2012, 7 pages.
International Search Report for PCT/US2012/046887 mailed Dec. 21, 2012, 12 pages.
Non-final Office Action for U.S. Appl. No. 13/222,484 mailed Nov. 8, 2012, 9 pages.
Final Office Action for U.S. Appl. No. 13/222,484 mailed Apr. 10, 2013, 10 pages.
International Search Report and Written Opinion for PCT/US2012/053654 mailed Feb. 15, 2013, 11 pages.
International Search Report and Written Opinion for PCT/US2012/062070, mailed Jan. 21, 2013, 12 pages.
International Search Report and Written Opinion for PCT/US2012/067230 mailed Feb. 21, 2013, 10 pages.
Lie, Donald Y.C. et al., "Design of Highly-Efficient Wideband RF Polar Transmitters Using Envelope-Tracking (ET) for Mobile WiMAX/Wibro Applications," IEEE 8th International Conference on ASIC (ASCION), Oct. 20-23, 2009, pp. 347-350.
Lie, Donald Y.C. et al., "Highly Efficient and Linear Class E SiGe Power Amplifier Design," 8th International Conference on Solid-State and Integrated Circuit Technology (ICSICT), Oct. 23-26, 2006, pp. 1526-1529.
Non-Final Office Action for U.S. Appl. No. 13/367,973, mailed Sep. 24, 2013, 8 pages.
Notice of Allowance for U.S. Appl. No. 13/423,649, mailed Aug. 30, 2013, 8 pages.
Notice of Allowance for U.S. Appl. No. 13/316,229, mailed Aug. 29, 2013, 8 pages.
Quayle Action for U.S. Appl. No. 13/531,719, mailed Oct. 10, 2013, 5 pages.
Notice of Allowance for U.S. Appl. No. 13/602,856, mailed Sep. 24, 2013, 9 pages.
Notice of Allowance for U.S. Appl. No. 13/297,490, mailed Feb. 27, 2014, 7 pages.
Non-Final Office Action for U.S. Appl. No. 13/297,470, mailed Feb. 20, 2014, 16 pages.
Notice of Allowance for U.S. Appl. No. 13/550,049, mailed Mar. 6, 2014, 5 pages.
International Preliminary Report on Patentability for PCT/US2012/046887, mailed Jan. 30, 2014, 8 pages.

(56) References Cited

OTHER PUBLICATIONS

International Preliminary Report on Patentability for PCT/US2012/053654, mailed Mar. 13, 2014, 7 pages.
Non-Final Office Action for U.S. Appl. No. 13/661,552, mailed Feb. 21, 2014, 5 pages.
International Search Report and Written Opinion for PCT/US2013/065403, mailed Feb. 5, 2014, 11 pages.
Examination Report for European Patent Application No. 11720630.0 issued Mar. 18, 2014, 4 pages.
Notice of Allowance for U.S. Appl. No. 14/022,858 mailed May 27, 2014, 6 pages.
Non-Final Office Action for U.S. Appl. No. 13/367,973 mailed Apr. 25, 2014, 5 pages.
Non-Final Office Action for U.S. Appl. No. 13/647,815 mailed May 2, 2014, 6 pages.
Non-Final Office Action for U.S. Appl. No. 13/689,883 mailed Mar. 27, 2014, 13 pages.
International Preliminary Report on Patentability for PCT/US2012/062070 mailed May 8, 2014, 8 pages.
International Search Report and Written Opinion for PCT/US2012/062110 issued Apr. 8, 2014, 12 pages.
International Preliminary Report on Patentability for PCT/US2012/062110 mailed May 8, 2014, 9 pages.
Non-Final Office Action for U.S. Appl. No. 13/692,084 mailed Apr. 10, 2014, 6 pages.
Non-Final Office Action for U.S. Appl. No. 13/684,826 mailed Apr. 3, 2014, 5 pages.
Notice of Allowance for U.S. Appl. No. 14/022,940, mailed Jun. 10, 2014, 7 pages.
Non-Final Office Action for U.S. Appl. No. 13/714,600 mailed May 9, 2014, 14 pages.
Non-Final Office Action for U.S. Appl. No. 13/951,976 mailed Apr. 4, 2014, 7 pages.
Notice of Allowance for U.S. Appl. No. 12/836,307 mailed May 5, 2014, 6 pages.
Final Office Action for U.S. Appl. No. 13/297,470, mailed Oct. 25, 2013, 17 pages.
Notice of Allowance for U.S. Appl. No. 14/022,858, mailed Oct. 25, 2013, 9 pages.
Non-Final Office Action for U.S. Appl. No. 13/550,049, mailed Nov. 25, 2013, 6 pages.
Non-Final Office Action for U.S. Appl. No. 12/836,307, mailed Nov. 5, 2013, 6 pages.
Examination Report for European Patent Application No. 11720630, mailed Aug. 16, 2013, 5 pages.
Notice of Allowance for U.S. Appl. No. 14/072,140, mailed Dec. 2, 2014, 8 pages.
First Office Action for Chinese Patent Application No. 2012800265590, issued Nov. 3, 2014, 14 pages (with English translation).
Notice of Allowance for U.S. Appl. No. 13/486,012, mailed Nov. 21, 2014, 8 pages.
Final Office Action for U.S. Appl. No. 13/689,883, mailed Jan. 2, 2015, 13 pages.
Notice of Allowance for U.S. Appl. No. 13/690,187, mailed Dec. 19, 2014, 8 pages.
Notice of Allowance for U.S. Appl. No. 13/747,694, mailed Dec. 22, 2014, 9 pages.
Notice of Allowance for U.S. Appl. No. 13/951,976, mailed Dec. 26, 2014, 9 pages.
Non-Final Office Action for U.S. Appl. No. 13/747,749, mailed Nov. 12, 2014, 32 pages.
Non-Final Office Action for U.S. Appl. No. 12/836,307, mailed Sep. 25, 2014, 5 pages.
Advisory Action for U.S. Appl. No. 13/297,470, mailed Sep. 19, 2014, 3 pages.
Non-Final Office Action for U.S. Appl. No. 13/297,470, mailed Oct. 20, 2014, 22 pages.
Notice of Allowance for U.S. Appl. No. 13/367,973, mailed Sep. 15, 2014, 7 pages.
Extended European Search Report for European Patent Application No. 12794149.0, issued Oct. 29, 2014, 6 pages.
Notice of Allowance for U.S. Appl. No. 13/647,815, mailed Sep. 19, 2014, 6 pages.
Non-Final Office Action for U.S. Appl. No. 13/661,227, mailed Sep. 29, 2014, 24 pages.
Notice of Allowance for U.S. Appl. No. 13/684,826, mailed Sep. 8, 2014, 6 pages.
Non-Final Office Action for U.S. Appl. No. 13/714,600, mailed Oct. 15, 2014, 13 pages.
Notice of Allowance for U.S. Appl. No. 13/914,888, mailed Oct. 17, 2014, 10 pages.
Non-Final Office Action for U.S. Appl. No. 13/747,725, mailed Oct. 7, 2014, 6 pages.
International Search Report and Written Opinion for PCT/US2014/012927, mailed Sep. 30, 2014, 11 pages.
International Search Report and Written Opinion for PCT/US2014/028178, mailed Sep. 30, 2014, 17 pages.
Hassan, Muhammad, et al., "A Combined Series-Parallel Hybrid Envelope Amplifier for Envelope Tracking Mobile Terminal RF Power Amplifier Applications," IEEE Journal of Solid-State Circuits, vol. 47, No. 5, May 1, 2012, pp. 1185-1198.
Hoversten, John, et al., "Codesign of PA, Supply, and Signal Processing for Linear Supply-Modulated RF Transmitters," IEEE Transactions on Microwave Theory and Techniques, vol. 60, No. 6, Jun. 2012, pp. 2010-2020.
European Search Report for Patent Application No. 14162682.0, issued Aug. 27, 2014, 7 pages.
Notice of Allowance for U.S. Appl. No. 14/072,140, mailed Aug. 27, 2014, 8 pages.
Non-Final Office Action for U.S. Appl. No. 14/072,225, mailed Aug. 15, 2014, 4 pages.
Non-Final Office Action for U.S. Appl. No. 13/486,012, mailed Jul. 28, 2014, 7 pages.
Notice of Allowance for U.S. Appl. No. 13/548,283, mailed Sep. 3, 2014, 7 pages.
Non-Final Office Action for U.S. Appl. No. 13/689,883, mailed Aug. 27, 2014, 12 pages.
Notice of Allowance for U.S. Appl. No. 13/661,552, mailed Jun. 13, 2014, 5 pages.
Notice of Allowance for U.S. Appl. No. 13/692,084, mailed Jul. 23, 2014, 7 pages.
Notice of Allowance for U.S. Appl. No. 13/690,187, mailed Sep. 3, 2014, 9 pages.
International Preliminary Report on Patentability and Written Opinion for PCT/US2012/067230, mailed Jun. 12, 2014, 7 pages.
Notice of Allowance for U.S. Appl. No. 13/684,826, mailed Jul. 18, 2014, 7 pages.
Non-Final Office Action for U.S. Appl. No. 13/782,142, mailed Sep. 4, 2014, 6 pages.
International Search Report and Written Opinion for PCT/US2014/028089, mailed Jul. 17, 2014, 10 pages.
Invitation to Pay Additional Fees and Partial International Search Report for PCT/US2014/028178, mailed Jul. 24, 2014, 7 pages.
Notice of Allowance for U.S. Appl. No. 13/948,291, mailed Feb. 11, 2015, 7 pages.
First Office Action for Chinese Patent Application No. 2011800302735, issued Dec. 3, 2014, 15 pages (with English translation).
Notice of Allowance for U.S. Appl. No. 14/022,858, mailed Feb. 17, 2015, 7 pages.
Notice of Allowance for U.S. Appl. No. 14/072,225, mailed Jan. 22, 2015, 7 pages.
Final Office Action for U.S. Appl. No. 13/661,227, mailed Feb. 6, 2015, 24 pages.
International Preliminary Report on Patentability for PCT/US2013/052277, mailed Feb. 5, 2015, 9 pages.
Non-Final Office Action for U.S. Appl. No. 14/048,109, mailed Feb. 18, 2015, 8 pages.
Notice of Allowance for U.S. Appl. No. 13/747,725, mailed Feb. 2, 2015, 10 pages.
Corrected Notice of Allowance for U.S. Appl. No. 13/297,470, mailed Jun. 5, 2015, 11 pages.

(56) References Cited

OTHER PUBLICATIONS

Advisory Action for U.S. Appl. No. 13/689,883, mailed Apr. 20, 2015, 3 pages.
Advisory Action for U.S. Appl. No. 13/661,227, mailed May 12, 2015, 3 pages.
Advisory Action for U.S. Appl. No. 13/714,600, mailed May 26, 2015, 3 pages.
Notice of Allowance for U.S. Appl. No. 13/747,725, mailed May 13, 2015, 9 pages.
Notice of Allowance for U.S. Appl. No. 13/747,749, mailed Jun. 4, 2015, 8 pages.
Non-Final Office Action for U.S. Appl. No. 13/552,768, mailed Apr. 20, 2015, 12 pages.
Non-Final Office Action for U.S. Appl. No. 13/689,922, mailed Apr. 20, 2015, 19 pages.
Non-Final Office Action for U.S. Appl. No. 13/727,911, mailed Apr. 20, 2015, 10 pages.
Non-Final Office Action for U.S. Appl. No. 14/163,229, mailed Apr. 23, 2015, 9 pages.
Non-Final Office Action for U.S. Appl. No. 14/163,256, mailed Apr. 23, 2015, 9 pages.
Notice of Allowance for U.S. Appl. No. 14/176,611, mailed Apr. 27, 2015, 7 pages.
Notice of Allowance for U.S. Appl. No. 13/661,164, mailed Jun. 3, 2015, 6 pages.
Non-Final Office Action for U.S. Appl. No. 14/082,629, mailed Jun. 18, 2015, 15 pages.
European Search Report for European Patent Application No. 14190851.7, issued Mar. 5, 2015, 6 pages.
Notice of Allowance for U.S. Appl. No. 12/836,307, mailed Mar. 2, 2015, 6 pages.
Notice of Allowance for U.S. Appl. No. 13/297,470, mailed Feb. 25, 2015, 15 pages.
Corrected Notice of Allowance for U.S. Appl. No. 13/297,470, mailed Apr. 6, 2015, 11 pages.
Non-Final Office Action for U.S. Appl. No. 14/122,852, mailed Feb. 27, 2015, 5 pages.
Final Office Action for U.S. Appl. No. 13/714,600, mailed Mar. 10, 2015, 14 pages.
Non-Final Office Action for U.S. Appl. No. 14/056,292, mailed Mar. 6, 2015, 8 pages.
Final Office Action for U.S. Appl. No. 13/747,749, mailed Mar. 20, 2015, 35 pages.
Non-Final Office Action for U.S. Appl. No. 14/072,120, mailed Apr. 14, 2015, 8 pages.
European Examination Report for European Patent Application No. 14162682.0, mailed May 22, 2015, 5 pages.
International Preliminary Report on Patentability for PCT/US2013/065403, mailed Apr. 30, 2015, 8 pages.
First Office Action for Chinese Patent Application No. 201280052694.2, issued Mar. 24, 2015, 35 pages.
Notice of Allowance for U.S. Appl. No. 13/948,291, mailed Jul. 17, 2015, 8 pages.
Non-Final Office Action for U.S. Appl. No. 13/689,883, mailed Jul. 24, 2015, 13 pages.
Non-Final Office Action for U.S. Appl. No. 13/661,227, mailed Jul. 27, 2015, 25 pages.
Non-Final Office Action for U.S. Appl. No. 13/714,600, mailed Jul. 17, 2015, 14 pages.
Notice of Allowance for U.S. Appl. No. 14/212,154, mailed Jul. 17, 2015, 8 pages.
Notice of Allowance for U.S. Appl. No. 14/212,199, mailed Jul. 20, 2015, 8 pages.
Notice of Allowance for U.S. Appl. No. 14/072,120, mailed Jul. 30, 2015, 7 pages.
First Office Action and Search Report for Chinese Patent Application No. 201280007941.7, issued May 13, 2015, 13 pages.

Yun, Hu et al., "Study of envelope tracking power amplifier design," Journal of Circuits and Systems, vol. 15, No. 6, ' Dec. 2010, pp. 6-10.
Wu, Patrick Y. et al., "A Two-Phase Switching Hybrid Supply Modulator for RF Power Amplifiers with 9% Efficiency Improvement," IEEE Journal of Solid-State Circuits, vol. 45, No. 12, Dec. 2010, pp. 2543-2556.
Yousefzadeh, Vahid et al., "Band Separation and Efficiency Optimization in Linear-Assisted Switching Power Amplifiers," 37th IEEE Power Electronics Specialists Conference, Jun. 18-22, 2006, pp. 1-7.
International Preliminary Report on Patentability for PCT/US2012/040317, mailed Dec. 12, 2013, 5 pages.
Notice of Allowance for U.S. Appl. No. 13/531,719, mailed Dec. 30, 2013, 7 pages.
Non-Final Office Action for U.S. Appl. No. 14/022,940, mailed Dec. 20, 2013, 5 pages.
International Search Report and Written Opinion for PCT/US2013/052277, mailed Jan. 7, 2014, 14 pages.
Notice of Allowance for U.S. Appl. No. 13/747,749, mailed Oct. 2, 2015, 8 pages.
Non-Final Office Action for U.S. Appl. No. 14/702,192, mailed Oct. 7, 2015, 7 pages.
Final Office Action for U.S. Appl. No. 13/689,922, mailed Oct. 6, 2015, 20 pages.
Notice of Allowance for U.S. Appl. No. 13/727,911, mailed Sep. 14, 2015, 8 pages.
Notice of Allowance for U.S. Appl. No. 13/552,768, mailed Sep. 22, 2015, 9 pages.
Non-Final Office Action for U.S. Appl. No. 14/101,770, mailed Sep. 21, 2015, 5 pages.
Notice of Allowance for U.S. Appl. No. 13/661,164, mailed Oct. 21, 2015, 7 pages.
Non-Final Office Action for U.S. Appl. No. 14/254,215, mailed Oct. 15, 2015, 5 pages.
Notice of Allowance for U.S. Appl. No. 14/072,140, mailed Aug. 20, 2015, 6 pages.
Non-Final Office Action for U.S. Appl. No. 14/072,225, mailed Aug. 18, 2015, 4 pages.
Notice of Allowance for U.S. Appl. No. 13/747,725, mailed Sep. 1, 2015, 9 pages.
Notice of Allowance for U.S. Appl. No. 14/027,416, mailed Aug. 11, 2015, 9 pages.
International Preliminary Report on Patentability for PCT/US2014/012927, mailed Aug. 6, 2015, 9 pages.
First Office Action and Search Report for Chinese Patent Application No. 201210596632.X, mailed Jun. 25, 2015, 16 pages.
Second Office Action for Chinese Patent Application No. 201180030273.5, issued Aug. 14, 2015, 8 pages.
International Preliminary Report on Patentability for PCT/US2014/028089, mailed Sep. 24, 2015, 8 pages.
International Preliminary Report on Patentability for PCT/US2014/028178, mailed Sep. 24, 2015, 11 pages.
First Office Action for Chinese Patent Application No. 201180067293.X, mailed Aug. 6, 2015, 13 pages.
Author Unknown, "Automatically," Definition, Dictionary.com Unabridged, 2015, pp. 1-6, http://dictionary.reference.com/browse/automatically.
Notice of Allowance for U.S. Appl. No. 13/747,725, mailed Oct. 28, 2015, 9 pages.
Notice of Allowance for U.S. Appl. 13/727,911, mailed Nov. 10, 2015, 8 pages.
Notice of Allowance for U.S. Appl. No. 14/163,229, mailed Nov. 5, 2015, 8 pages.
Final Office Action for U.S. Appl. No. 14/163,256, mailed Nov. 2, 2015, 10 pages.
Final Office Action for U.S. Appl. No. 14/082,629, mailed Nov. 4, 2015, 17 pages.
Non-Final Office Action for U.S. Appl. No. 14/458,341, mailed Nov. 12, 2015, 5 pages.

* cited by examiner

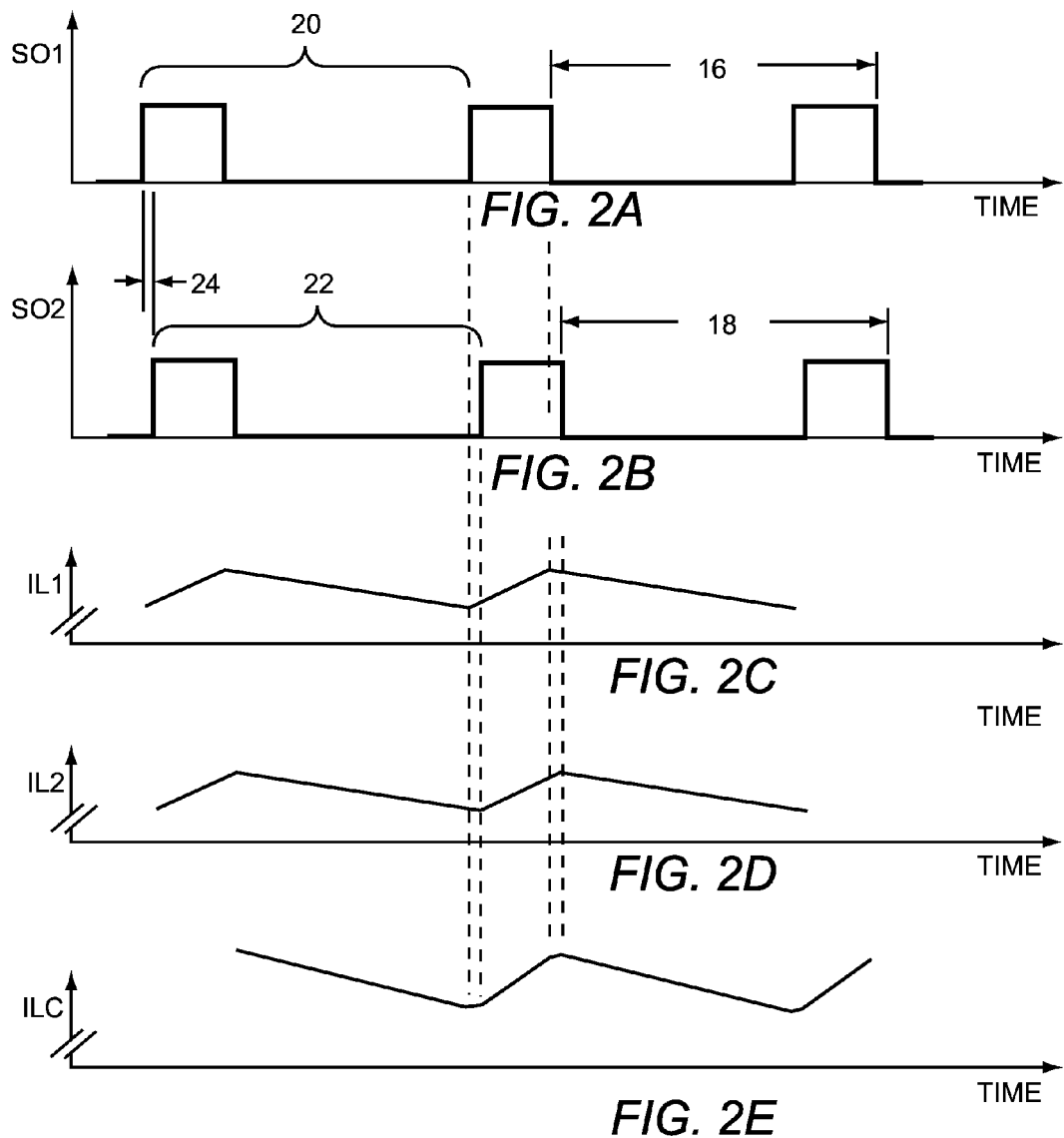

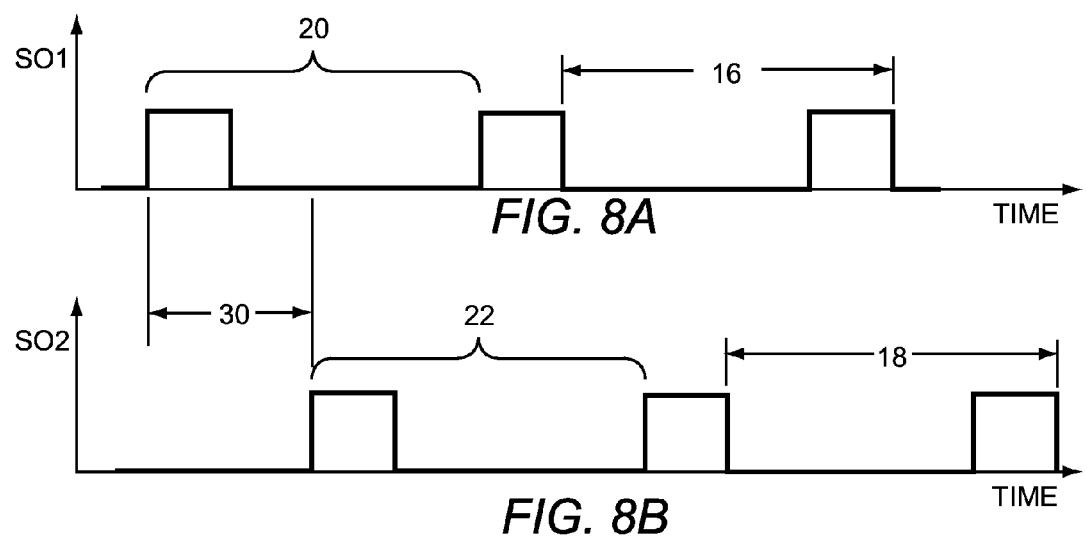

USING A SWITCHING SIGNAL DELAY TO REDUCE NOISE FROM A SWITCHING POWER SUPPLY

RELATED APPLICATIONS

This application claims the benefit of U.S. provisional patent application No. 61/565,092, filed Nov. 30, 2011, the disclosure of which is incorporated herein by reference in its entirety.

This application is related to U.S. patent application Ser. No. 13/689,922 entitled PHASE RECONFIGURABLE SWITCHING POWER SUPPLY, filed Nov. 30, 2012, which is concurrently filed herewith and incorporated herein by reference in its entirety.

FIELD OF THE DISCLOSURE

The present disclosure relates to switching power supplies and circuits that are powered from switching power supplies.

BACKGROUND

Switching power supplies that use inductive elements as energy transfer elements tend to have noise in their power supply output signals due to ripple currents in the inductive elements. The ripple currents are caused by alternating cycles of increasing current and decreasing current in the inductive elements. Inductive elements having higher inductances tend to have smaller ripple currents. However, higher inductances may reduce slew rates of the power supply output signals. As such, there may be a trade-off between higher inductances that have smaller ripple currents and lower inductances that increase slew rates. Thus, there is a need for switching power supplies that use inductive elements as energy transfer elements that improve upon the trade-off between the higher inductances that have smaller ripple currents and the lower inductances that increase slew rates.

SUMMARY

Embodiments of the present disclosure relate to circuitry, which includes power supply switching circuitry, a first inductive element, and a second inductive element. The power supply switching circuitry provides a first switching output signal to the first inductive element and a second switching output signal to the second inductive element. The first inductive element has a first inductor current and the second inductive element has a second inductor current. The second switching output signal is delayed from the first switching output signal by a switching signal delay. The first inductor current and the second inductor current combine to provide a combined inductor current, which has a frequency response with a group of notches, such that frequency locations of the group of notches are based on the switching signal delay.

In one embodiment of the present disclosure, a first power supply includes the power supply switching circuitry, the first inductive element, and the second inductive element. The first power supply provides a first power supply output signal based on the combined inductor current. The switching signal delay is selected to locate one or more of the frequency locations of the group of notches to reduce noise in the first power supply output signal at one or more targeted frequencies.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIGS. 2A, 2B, 2C, 2D, and 2E are graphs illustrating a first switching output signal, a second switching output signal, a first inductor current, a second inductor current, and a combined inductor current, respectively, shown in FIG. 1 according to one embodiment of the first switching output signal, the second switching output signal, the first inductor current, the second inductor current, and the combined inductor current.

FIGS. 8A and 8B are graphs illustrating the first switching output signal and the second switching output signal, respectively, of the first power supply shown in FIG. 6 according to an alternate embodiment of the first power supply.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
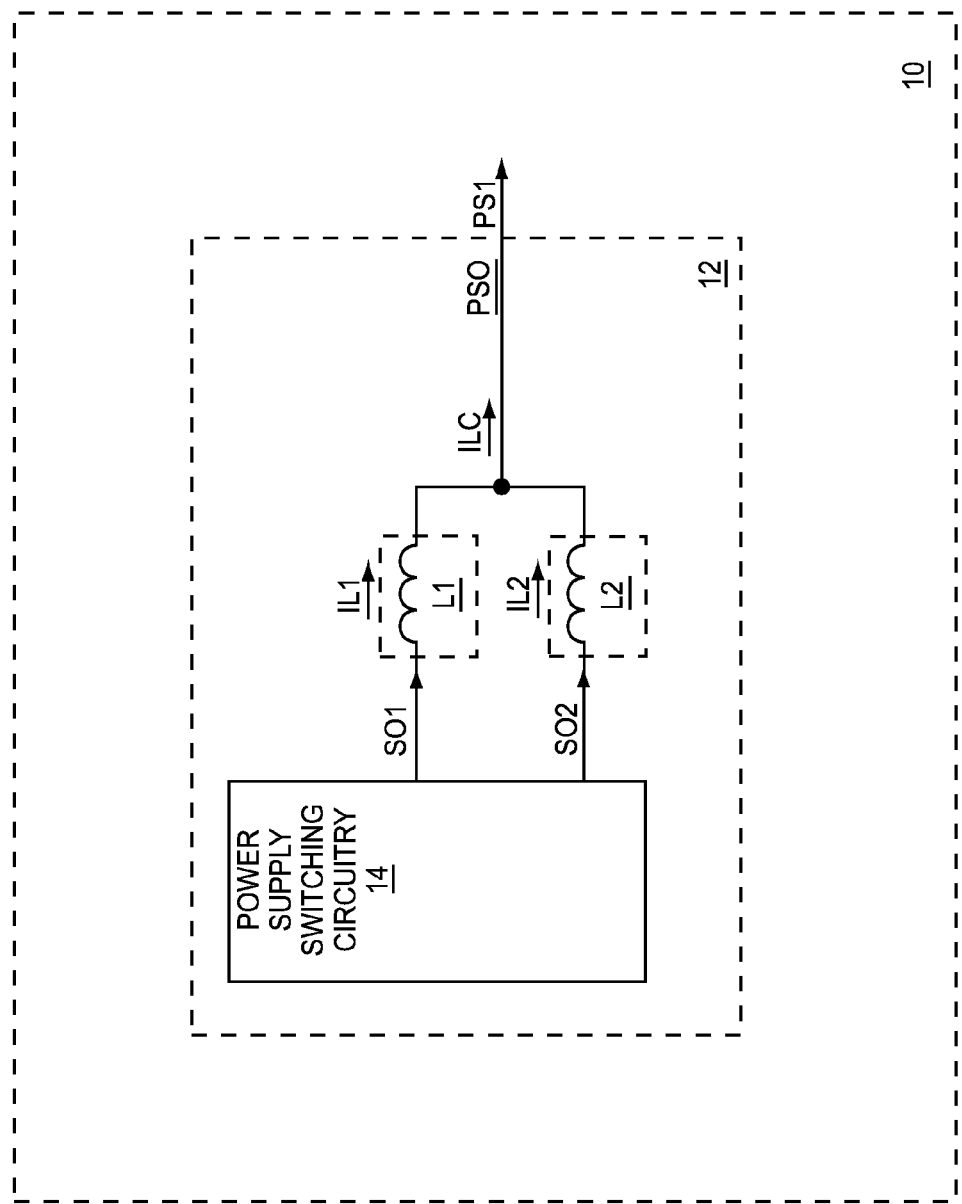
FIG. 1 shows circuitry according to one embodiment of the present disclosure.

FIG. 1 shows circuitry 10 according to one embodiment of the present disclosure. The circuitry 10 includes a first power supply 12 having a power supply output PSO. The first power supply 12 includes power supply switching circuitry 14, a first inductive element L1, and a second inductive element L2. The first inductive element L1 is coupled between the power supply switching circuitry 14 and the power supply output PSO. The second inductive element L2 is coupled between the power supply switching circuitry 14 and the power supply output PSO. The power supply switching circuitry 14 provides a first switching output signal SO1 to the first inductive element L1 and a second switching output signal SO2 to the second inductive element L2.

The first inductive element L1 has a first inductor current IL1 and the second inductive element L2 has a second inductor current IL2. The first inductor current IL1 and the second inductor current IL2 combine to provide a combined inductor current ILC. The first power supply 12 provides a first power supply output signal PS1 via the power supply output PSO based on the combined inductor current ILC. In one embodiment of the first inductive element L1 and the second inductive element L2, an inductance of the second inductive element L2 is about equal to an inductance of the first inductive element L1.

FIGS. 2A, 2B, 2C, 2D, and 2E are graphs illustrating the first switching output signal SO1, the second switching output signal SO2, the first inductor current IL1, the second inductor current IL2, and the combined inductor current ILC, respectively, shown in FIG. 1 according to one embodiment of the first switching output signal SO1, the second switching output signal SO2, the first inductor current IL1, the second inductor current IL2, and the combined inductor current ILC.

The first switching output signal SO1 has a first period 16 and the second switching output signal SO2 has a second period 18. The first switching output signal SO1 has a first waveshape 20 and the second switching output signal SO2 has a second waveshape 22. The second switching output signal SO2 is delayed from the first switching output signal SO1 by a switching signal delay 24.

Each of the first switching output signal SO1 and the second switching output signal SO2 is a rectangular shaped signal having a HIGH state and a LOW state. When the first switching output signal SO1 has the HIGH state, the first inductor current IL1 increases as shown in FIG. 2C. Conversely, when the first switching output signal SO1 has the LOW state, the first inductor current IL1 decreases as shown in FIG. 2C. Similarly, when the second switching output signal SO2 has the HIGH state, the second inductor current IL2 increases as shown in FIG. 2D. Conversely, when the second switching output signal SO2 has the LOW state, the second inductor current IL2 decreases as shown in FIG. 2D. The combined inductor current ILC is a summation of the first inductor current IL1 and the second inductor current IL2 as shown in FIG. 2E.

If a voltage across a first equivalent series resistance (ESR) of the first inductive element L1 (FIG. 1) and switches in the power supply switching circuitry 14 (FIG. 1) is negligibly small compared to a voltage across the inductance of the first inductive element L1 (FIG. 1), then the first inductor current IL1 increases and decreases in approximately a linear manner, as shown in FIG. 2C. However, if the voltage across the first ESR is significant compared to the voltage across the inductance of the first inductive element L1 (FIG. 1), then the first inductor current IL1 increases and decreases in approximately an exponential manner due to a voltage division across a series combination of the first ESR and the inductance of the first inductive element L1 (FIG. 1).

Similarly, if a voltage across a second ESR of the second inductive element L2 (FIG. 1) and switches in the power supply switching circuitry 14 (FIG. 1) is negligibly small compared to a voltage across the inductance of the second inductive element L2 (FIG. 1), then the second inductor current IL2 increases and decreases in approximately a linear manner, as shown in FIG. 2D. However, if the voltage across the second ESR is significant compared to the voltage across the inductance of the second inductive element L2 (FIG. 1), then the second inductor current IL2 increases and decreases in approximately an exponential manner due to a voltage division across a series combination of the second ESR and the inductance of the second inductive element L2 (FIG. 1).

If an amplitude of the second switching output signal SO2 is about equal to an amplitude of the first switching output signal SO1, as shown, when the first switching output signal SO1 and the second switching output signal SO2 both have the HIGH state, the combined inductor current ILC increases in a linear manner at twice the rate of the first inductor current IL1 and the second inductor current IL2 individually. Conversely, when the first switching output signal SO1 and the second switching output signal SO2 both have the LOW state, the combined inductor current ILC decreases in a linear manner at twice the rate of the first inductor current IL1 and the second inductor current IL2 individually. However, when the first switching output signal SO1 and the second switching output signal SO2 have opposite states from one another, the changes in the first inductor current IL1 and the second inductor current IL2 are opposite from one another. Therefore, the combined inductor current ILC increases or decreases at a substantially reduced rate. In summary, the combined inductor current ILC increases or decreases at rates that vary based on overlap of the first switching output signal SO1 and the second switching output signal SO2 As a result, a frequency response of the combined inductor current ILC is based on the amount of the overlap, which is based on the switching signal delay 24.

In one embodiment of the first switching output signal SO1 and the second switching output signal 502, the second waveshape 22 is about equal to the first waveshape 20. As such, the second period 18 is about equal to the first period 16, a duty-cycle of the second switching output signal SO2 is about equal to a duty-cycle of the first switching output signal 501, and the amplitude of the second switching output signal SO2 is about equal to the amplitude of the first switching output signal 501. If the switching signal delay 24 is equal to about zero, then the first switching output signal SO1 and the second switching output signal SO2 are about phase-aligned. If the switching signal delay 24 is not equal to zero, then the first switching output signal SO1 and the second switching output signal SO2 are not phase-aligned.

In a first embodiment of the switching signal delay 24, the switching signal delay 24 is less than or equal to about 20 nanoseconds. In a second embodiment of the switching signal delay 24, the switching signal delay 24 is less than or equal to about 15 nanoseconds. In a third embodiment of the switching signal delay 24, the switching signal delay 24 is less than or equal to about 10 nanoseconds. In a fourth embodiment of the switching signal delay 24, the switching signal delay 24 is less than or equal to about 5 nanoseconds. In a fifth embodiment of the switching signal delay 24, the switching signal delay 24 is greater than or equal to about 1 nanosecond. In a sixth embodiment of the switching signal delay 24, the switching signal delay 24 is greater than or equal to about 2 nanoseconds. In a seventh embodiment of the switching signal delay 24, the switching signal delay 24 is greater than or equal to about 3 nanoseconds. In an eighth embodiment of the switching signal delay 24, the switching signal delay 24 is greater than or equal to about 4 nanoseconds. In a ninth embodiment of the switching signal delay 24, the switching signal delay 24 is equal to about 7 nanoseconds.

In a first embodiment of the first period 16, the first period 16 is greater than about 50 nanoseconds. In a second embodiment of the first period 16, the first period 16 is greater than about 100 nanoseconds. In a third embodiment of the first period 16, the first period 16 is greater than about 150 nanoseconds. In a fourth embodiment of the first period 16, the first period 16 is greater than about 500 nanoseconds. In a fifth embodiment of the first period 16, the first period 16 is greater than about 1 microsecond. In a sixth embodiment of the first period 16, the first period 16 is greater than about 10 microseconds. In a seventh embodiment of the first period 16, the first period 16 is greater than about 100 microseconds. In an eighth embodiment of the first period 16, the first period 16 is less than about 10 microseconds. In a ninth embodiment of the first period 16, the first period 16 is less than about 100 microseconds. In a tenth embodiment of the first period 16, the first period 16 is less than about 1 millisecond.

In a first embodiment of the second period 18, the second period 18 is greater than about 50 nanoseconds. In a second embodiment of the second period 18, the second period 18 is greater than about 100 nanoseconds. In a third embodiment of the second period 18, the second period 18 is greater than about 150 nanoseconds. In a fourth embodiment of the second period 18, the second period 18 is greater than about 500 nanoseconds. In a fifth embodiment of the second period 18, the second period 18 is greater than about 1 microsecond. In a sixth embodiment of the second period 18, the second period 18 is greater than about 10 microseconds. In a seventh embodiment of the second period 18, the second period 18 is greater than about 100 microseconds. In an eighth embodiment of the second period 18, the second period 18 is less than about 10 microseconds. In a ninth embodiment of the second period 18, the second period 18 is less than about 100 microseconds. In a tenth embodiment of the second period 18, the second period 18 is less than about 1 millisecond.

Figure 3A:
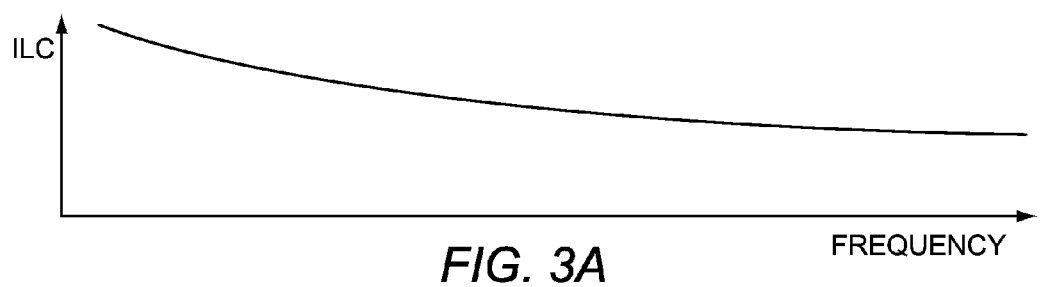
FIGS. 3A, 3B, and 3C are graphs illustrating different frequency responses of the combined inductor current shown in FIG. 1 according to three different embodiments of the combined inductor current.
Figure 3B:
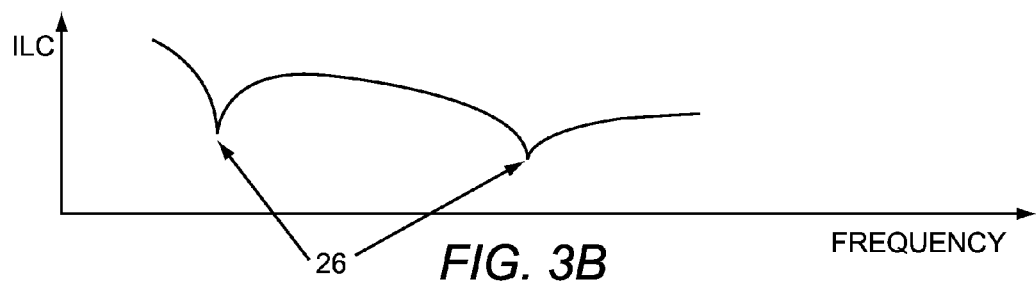
Figure 3C:
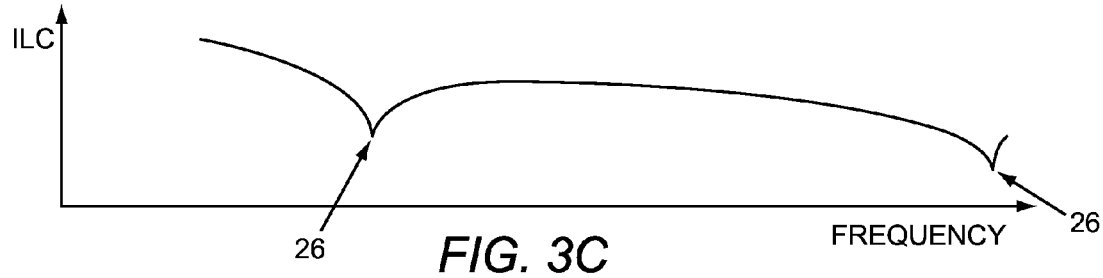

FIGS. 3A, 3B, and 3C are graphs illustrating different frequency responses of the combined inductor current ILC shown in FIG. 1 according to three different embodiments of the combined inductor current ILC. In the frequency response of the combined inductor current ILC (FIG. 1) illustrated in FIG. 3A, the switching signal delay 24 (FIGS. 2A and 2B) is equal to about zero, such that the first switching output signal SO1 (FIG. 1) and the second switching output signal SO2 (FIG. 1) are about phase-aligned. In the frequency response of the combined inductor current ILC (FIG. 1) illustrated in FIG. 3B, the switching signal delay 24 (FIGS. 2A and 2B) is equal to a first value, and in the frequency response of the combined inductor current ILC (FIG. 1) illustrated in FIG. 3C, the switching signal delay 24 (FIGS. 2A and 2B) is equal to a second value, which is less than the first value.

When the switching signal delay 24 (FIGS. 2A and 2B) is not equal to zero, the frequency response of the combined inductor current ILC (FIG. 1) has a group of related notches 26, as illustrated in FIGS. 3B and 3C. When the switching signal delay 24 (FIGS. 2A and 2B) is equal to about zero, the frequency response of the combined inductor current ILC (FIG. 1) does not have any notches 26, as illustrated in FIG. 3A. As the value of the switching signal delay 24 (FIGS. 2A and 2B) increases, frequency locations of the group of related notches 26 increase in frequency. In one embodiment of the frequency response of the combined inductor current ILC (FIG. 1). The notches 26 in the group of related notches 26 are harmonically related to one another.

In general, the frequency locations of the group of related notches 26 are based on the switching signal delay 24 (FIGS. 2A and 2B). As such, in one embodiment of the switching signal delay 24 (FIGS. 2A and 2B), the switching signal delay 24 (FIGS. 2A and 2B) is selected to locate one or more of the frequency locations of the group of related notches 26 to reduce noise in the first power supply output signal PS1 (FIG. 1) at one or more targeted frequencies.

Figure 4:
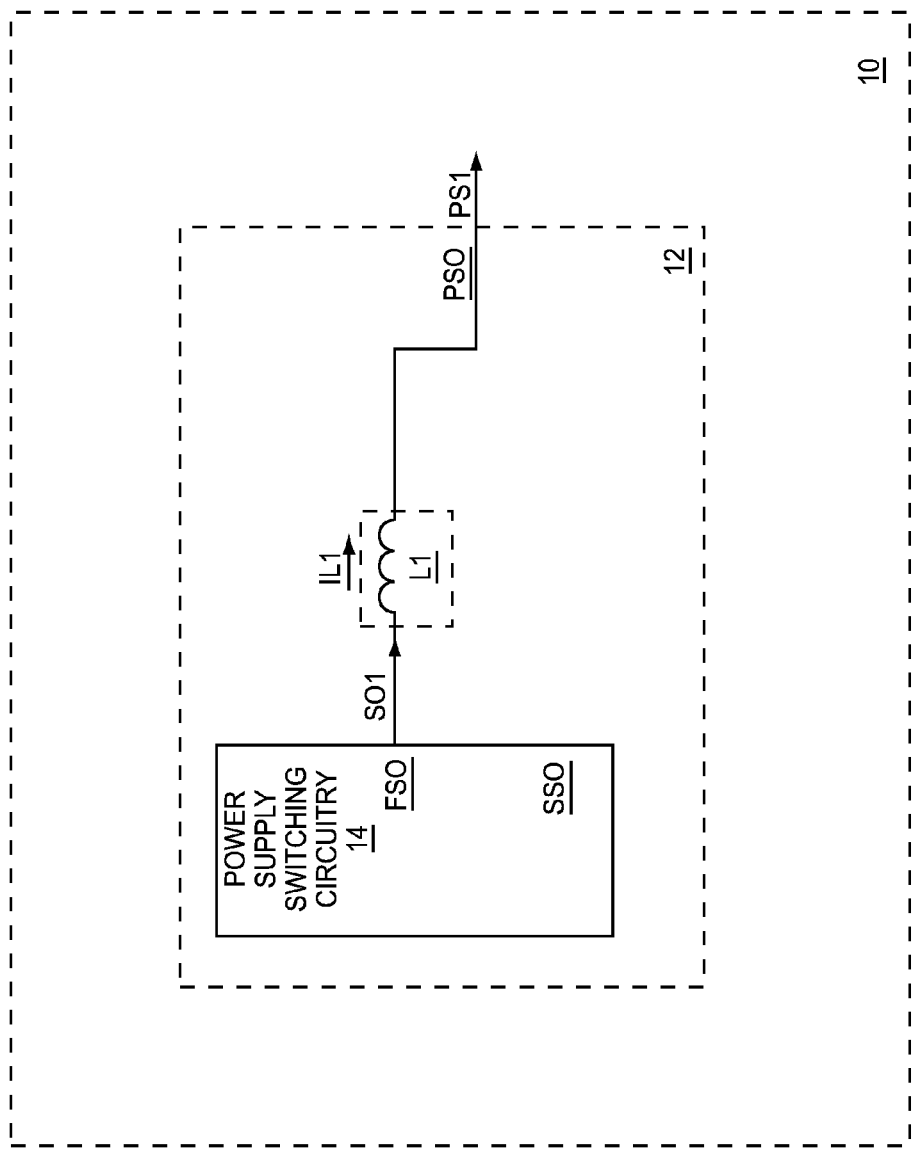
FIG. 4 shows the circuitry according to an alternate embodiment of the circuitry.

FIG. 4 shows the circuitry 10 according to an alternate embodiment of the circuitry 10. The first power supply 12 illustrated in FIG. 4 is similar to the first power supply 12 illustrated in FIG. 1, except in the first power supply 12 illustrated in FIG. 4, the second inductive element L2 is omitted, the combined inductor current ILC is not shown, and the power supply switching circuitry 14 has a first switching output FSO and a second switching output SSO.

The first inductive element L1 is coupled between the first switching output FSO and the power supply output PSO. The power supply switching circuitry 14 operates in one of a first operating mode and a second operating mode. During the first operating mode, the first switching output FSO is voltage compatible with the second switching output SSO. During the second operating mode, the first switching output FSO is allowed to be voltage incompatible with the second switching output SSO. The first power supply 12 provides the first power supply output signal PS1 via the power supply output PSO.

Figure 5:
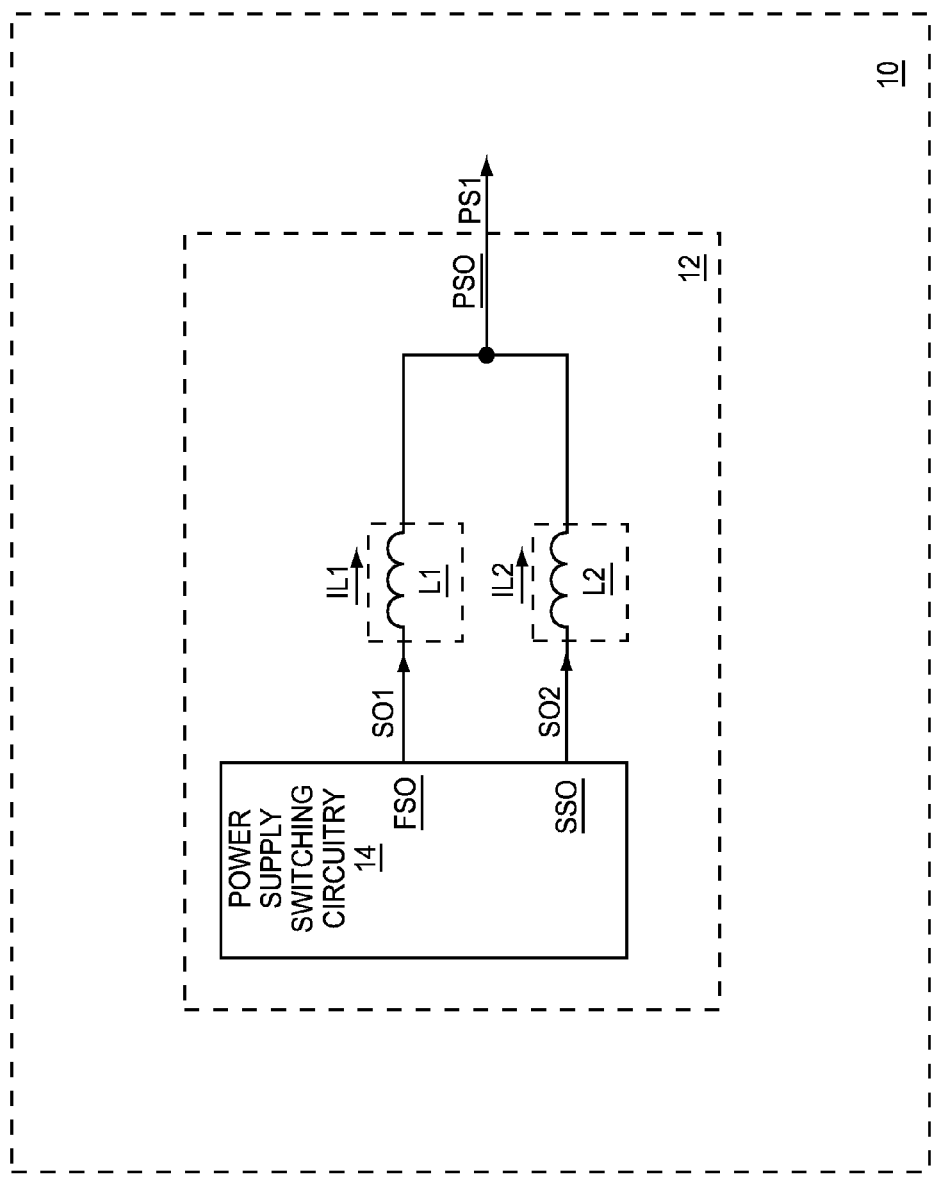
FIG. 5 shows the circuitry according to an additional embodiment of the circuitry.

FIG. 5 shows the circuitry 10 according to an additional embodiment of the circuitry 10. The first power supply 12 illustrated in FIG. 5 is similar to the first power supply 12 illustrated in FIG. 4, except the first power supply 12 illustrated in FIG. 5 further includes the second inductive element L2 coupled between the second switching output SSO and the power supply output PSO. The power supply switching circuitry 14 provides the first switching output signal SO1 to the first inductive element L1 via the first switching output FSO and provides the second switching output signal SO2 to the second inductive element L2 via the second switching output SSO. With various combinations of hardware configuration, operating mode selection, and phasing between the first switching output signal SO1 and the second switching output signal SO2, the first power supply 12 is capable of multiple configurations that may improve upon the trade-off between higher inductances that have smaller ripple currents and lower inductances that increase slew rates. Different embodiments of the circuitry 10 are presented that relate to the various combinations of hardware configuration, operating mode selection, and phasing between the first switching output signal SO1 and the second switching output signal SO2.

Figure 6:
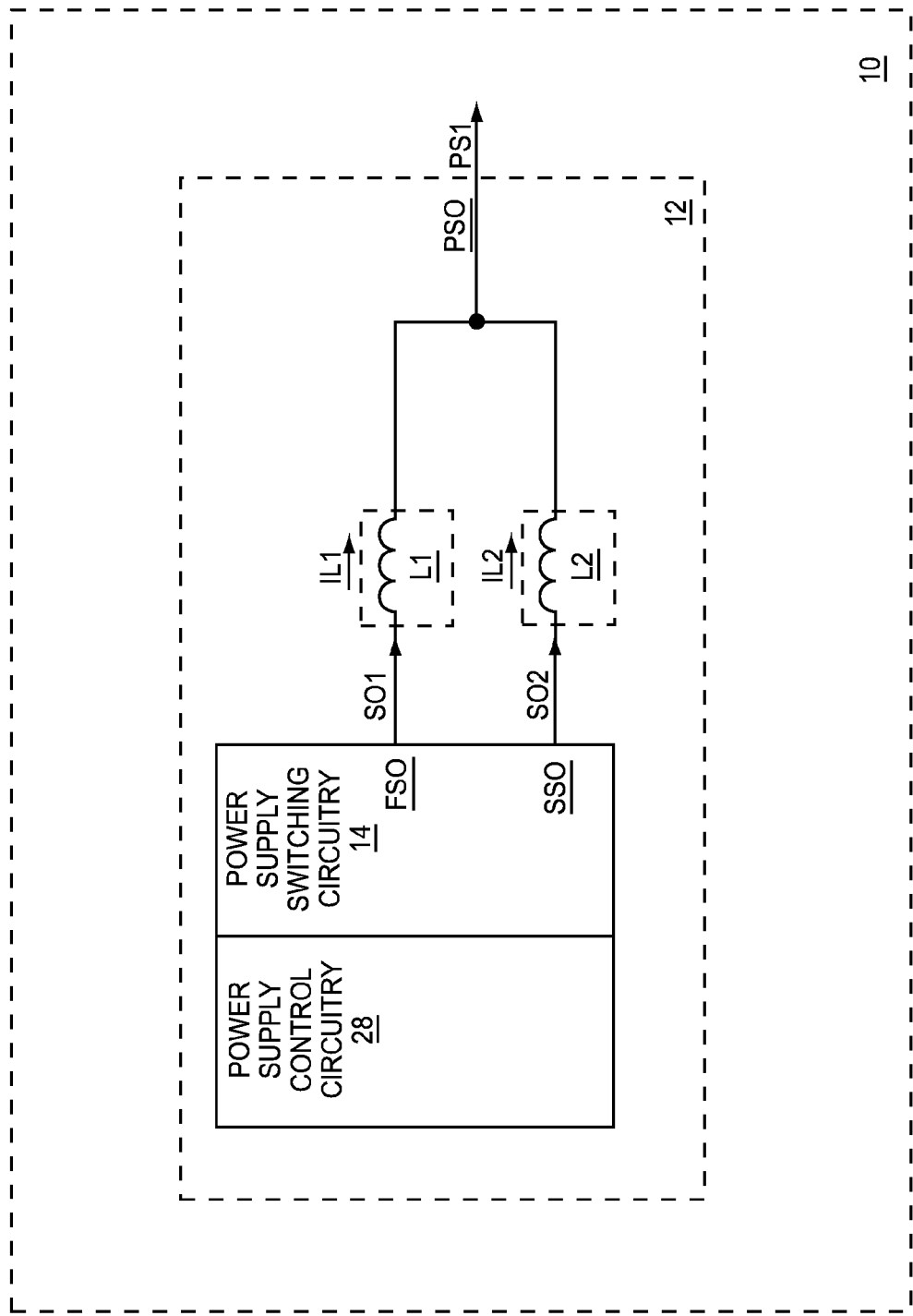
FIG. 6 shows the circuitry according to another embodiment of the circuitry.

FIG. 6 shows the circuitry 10 according to another embodiment of the circuitry 10. The first power supply 12 illustrated in FIG. 6 is similar to the first power supply 12 illustrated in FIG. 5, except the first power supply 12 illustrated in FIG. 6 further includes power supply control circuitry 28 coupled to the power supply switching circuitry 14. In one embodiment of the power supply control circuitry 28, the power supply control circuitry 28 selects the switching signal delay 24 (FIGS. 2A and 2B). In an alternate embodiment of the power supply control circuitry 28, the second switching output signal SO2 has a phase-shift 30 (FIGS. 7A, 7B, 8A, 8B, 9A, and 9B) relative to the first switching output signal SO1, such that the power supply control circuitry 28 selects the phase-shift 30 (FIGS. 7A, 7B, 8A, 8B, 9A, and 9B). In one embodiment of the power supply control circuitry 28, the power supply control circuitry 28 selects the one of the first operating mode and the second operating mode.

Since the first switching output signal SO1 and the second switching output signal SO2 may be controlled independently, in one embodiment of the power supply control circuitry 28, the power supply control circuitry 28 is prevented from selecting the first operating mode. In one embodiment of the first power supply 12, if a maximum output power that is needed from the first power supply 12 is low enough, then one of the switching outputs FSO, SSO may be disabled. As such, in one embodiment of the first switching output FSO, when a maximum magnitude of the first power supply output signal PS1 is less than a first threshold, the first switching output FSO is disabled. Conversely, in one embodiment of the second switching output SSO, when the maximum magnitude of the first power supply output signal PS1 is less than the first threshold, the second switching output SSO is disabled.

Figures 7A, 7B:
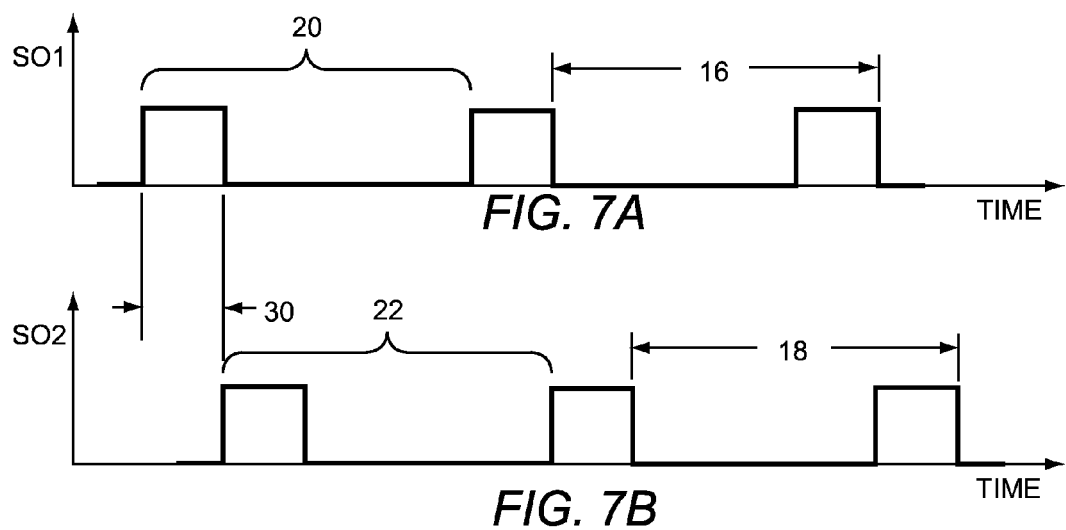
FIGS. 7A and 7B are graphs illustrating a first switching output signal and a second switching output signal, respectively, of a first power supply shown in FIG. 6 according to one embodiment of the first power supply.

FIGS. 7A and 7B are graphs illustrating the first switching output signal SO1 and the second switching output signal SO2, respectively, of the first power supply 12 shown in FIG. 6 according to one embodiment of the first power supply 12. The first switching output signal SO1 and the second switching output signal SO2 illustrated in FIGS. 7A and 7B, respectively, are similar to the first switching output signal SO1 and the second switching output signal SO2 illustrated in FIGS. 2A and 2B, respectively. However, the switching signal delay 24 (FIGS. 2A and 2B) is replaced with the phase-shift 30 between the first switching output signal SO1 and the second switching output signal SO2.

In this regard, the phase-shift 30 is such that the second switching output signal SO2 is phase-shifted from the first switching output signal SO1 by about 90 degrees. Further, the second waveshape 22 is about equal to the first waveshape 20, the second period 18 is about equal to the first period 16, a duty-cycle of the second switching output signal SO2 is about equal to a duty-cycle of the first switching output signal 501, and the amplitude of the second switching output signal SO2 is about equal to the amplitude of the first switching output signal 501.

Since the first switching output signal SO1 and the second switching output signal SO2 are not phase-aligned, the slew rate of the first power supply output signal PS1 (FIG. 6) may be reduced. However, the phase-shift 30 may reduce ripple current, which may increase efficiency of the first power supply 12 (FIG. 6), particularly if analog circuitry is used to regulate the voltage of the first power supply output signal PS1 (FIG. 6). Further, the phase-shift 30 may produce a beneficial harmonic frequency response of the ripple current. This trade-off between slew rate and ripple current may be appropriate if a bandwidth of the first power supply output signal PS1 (FIG. 6) is low enough. Therefore, in one embodiment of the first power supply 12 (FIG. 6), the bandwidth of the first power supply output signal PS1 (FIG. 6) is less than about 10 megahertz.

FIGS. 8A and 8B are graphs illustrating the first switching output signal SO1 and the second switching output signal SO2, respectively, of the first power supply 12 shown in FIG. 6 according to an alternate embodiment of the first power supply 12. The first switching output signal SO1 and the second switching output signal SO2 illustrated in FIGS. 8A and 8B, respectively, are similar to the first switching output signal SO1 and the second switching output signal SO2 illustrated in FIGS. 7A and 7B, respectively, except the phase-shift 30 is such that the second switching output signal SO2 is phase-shifted from the first switching output signal SO1 by about 180 degrees. Further, the second waveshape 22 is about equal to the first waveshape 20, the second period 18 is about equal to the first period 16, the duty-cycle of the second switching output signal SO2 is about equal to the duty-cycle of the first switching output signal SO1, and the amplitude of the second switching output signal SO2 is about equal to the amplitude of the first switching output signal SO1.

Since the first switching output signal SO1 and the second switching output signal SO2 are not phase-aligned, the slew rate of the first power supply output signal PS1 (FIG. 6) may be reduced. However, the phase-shift 30 may reduce ripple current, which may increase efficiency of the first power supply 12 (FIG. 6), particularly if analog circuitry is used to regulate the voltage of the first power supply output signal PS1 (FIG. 6). Further, the phase-shift 30 may produce a beneficial harmonic frequency response of the ripple current. This trade-off between slew rate and ripple current may be appropriate if a bandwidth of the first power supply output signal PS1 (FIG. 6) is low enough. Therefore, in one embodiment of the first power supply 12 (FIG. 6), the bandwidth of the first power supply output signal PS1 (FIG. 6) is less than about 10 megahertz.

Figure 9A:
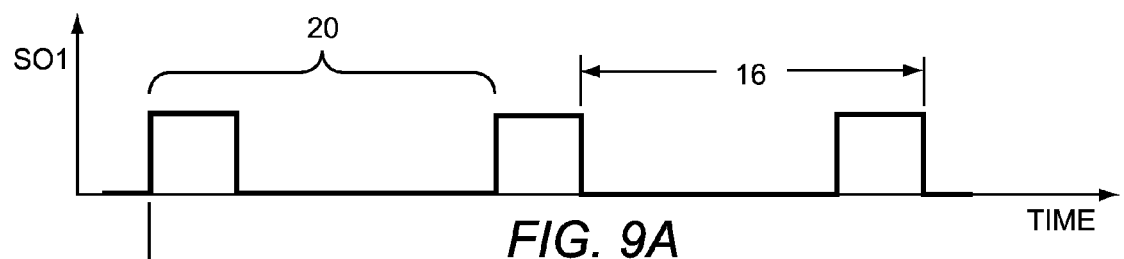
FIGS. 9A and 9B are graphs illustrating the first switching output signal and the second switching output signal, respectively, of the first power supply shown in FIG. 6 according to another embodiment of the first power supply.
Figure 9B:
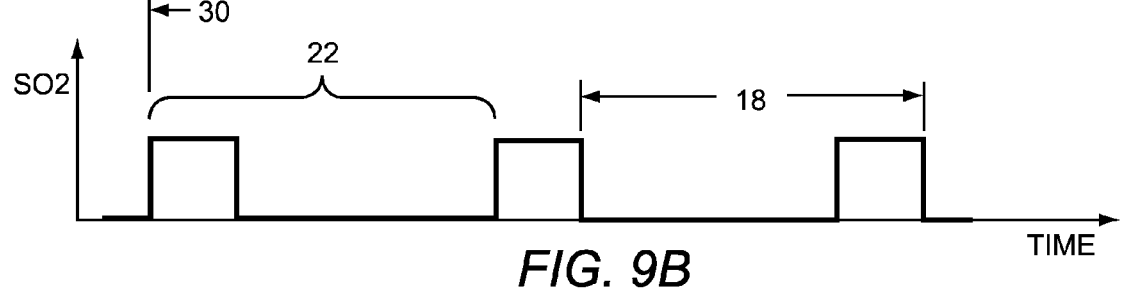

FIGS. 9A and 9B are graphs illustrating the first switching output signal SO1 and the second switching output signal SO2, respectively, of the first power supply 12 shown in FIG. 6 according to another embodiment of the first power supply 12. The first switching output signal SO1 and the second switching output signal SO2 illustrated in FIGS. 9A and 9B, respectively, are similar to the first switching output signal SO1 and the second switching output signal SO2 illustrated in FIGS. 7A and 7B, respectively, except the phase-shift 30 is small, such that the second switching output signal SO2 is about phase-aligned with the first switching output signal SO1. Further, the second waveshape 22 is about equal to the first waveshape 20, the second period 18 is about equal to the first period 16, the duty-cycle of the second switching output signal SO2 is about equal to the duty-cycle of the first switching output signal SO1, and the amplitude of the second switching output signal SO2 is about equal to the amplitude of the first switching output signal SO1.

Since the first switching output signal SO1 and the second switching output signal SO2 are about phase-aligned, the slew rate of the first power supply output signal PS1 (FIG. 6) may be increased. However, the ripple current may be increased, which may decrease efficiency of the first power supply 12 (FIG. 6), particularly if analog circuitry is used to regulate the voltage of the first power supply output signal PS1 (FIG. 6). This trade-off between slew rate and ripple current may be appropriate if the bandwidth of the first power supply output signal PS1 (FIG. 6) is high enough to justify the increased slew rate. Therefore, in one embodiment of the first power supply 12 (FIG. 6), the bandwidth of the first power supply output signal PS1 (FIG. 6) is greater than about 10 megahertz.

As previously described, FIGS. 2A and 2B are graphs illustrating the first switching output signal SO1 and the second switching output signal 502, respectively, of the first power supply 12 shown in FIG. 1. In one embodiment of the first power supply 12 (FIG. 1), the switching signal delay 24 is small compared to the first period 16. In this regard, the second switching output signal SO2 is at least somewhat phase-aligned with the first switching output signal 501. Further, the second waveshape 22 is about equal to the first waveshape 20, the second period 18 is about equal to the first period 16, the duty-cycle of the second switching output signal SO2 is about equal to the duty-cycle of the first switching output signal 501, and the amplitude of the second switching output signal SO2 is about equal to the amplitude of the first switching output signal 501.

Since the first switching output signal SO1 and the second switching output signal SO2 are at least somewhat phase-aligned, the slew rate of the first power supply output signal PS1 (FIG. 1) may be increased. However, the ripple current may be increased, which may decrease efficiency of the first power supply 12 (FIG. 1), particularly if analog circuitry is used to regulate the voltage of the first power supply output signal PS1 (FIG. 1). This trade-off between slew rate and ripple current may be appropriate if the bandwidth of the first power supply output signal PS1 (FIG. 1) is high enough to justify the increased slew rate. Therefore, in one embodiment of the first power supply 12 (FIG. 1), the bandwidth of the first power supply output signal PS1 (FIG. 1) is greater than about 10 megahertz.

Figure 10:
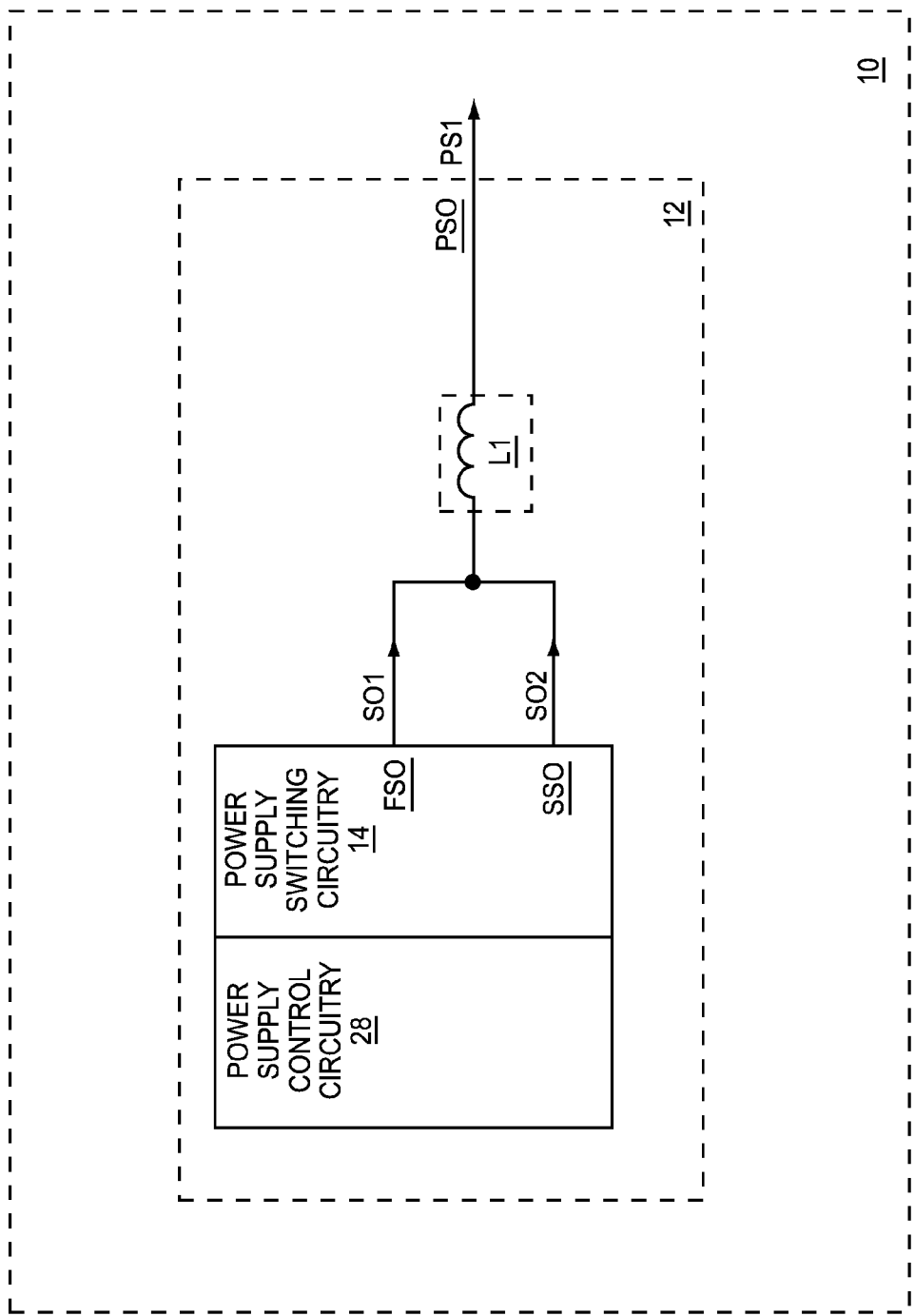
FIG. 10 shows the circuitry according to a further embodiment of the circuitry.

FIG. 10 shows the circuitry 10 according to a further embodiment of the circuitry 10. The first power supply 12 illustrated in FIG. 10 is similar to the first power supply 12 illustrated in FIG. 6, except in the first power supply 12 illustrated in FIG. 10, the second inductive element L2 is omitted. Further, the first switching output FSO is coupled to the second switching output SSO. In one embodiment of the first power supply 12, the first switching output FSO is directly coupled to the second switching output SSO. As such, for proper operation, the first switching output FSO must be voltage compatible with the second switching output SSO. In this regard, the power supply control circuitry 28 is prevented from selecting the second operating mode. Additionally, the second waveshape 22 (FIG. 2B) is about equal to the first waveshape 20 (FIG. 2A), the second period 18 (FIG. 2B) is about equal to the first period 16 (FIG. 2A), a duty-cycle of the second switching output signal SO2 (FIG. 2B) is about equal to a duty-cycle of the first switching output signal SO1 (FIG. 2A), the amplitude of the second switching output signal SO2 (FIG. 2B) is about equal to the amplitude of the first switching output signal SO1 (FIG. 2A), and the switching signal delay 24 (FIGS. 2A and 2B) is equal to about zero, such that the first switching output signal SO1 (FIG. 2A) and the second switching output signal SO2 (FIG. 2B) are about phase-aligned.

By using only the first inductive element L1 instead of both the first inductive element L1 and the second inductive element L2 (FIG. 6), the total inductance in the first power supply 12 may be increased, which may reduce the slew rate of the first power supply output signal PS1. However, the increased inductance may reduce ripple current, which may increase efficiency of the first power supply 12, particularly if analog circuitry is used to regulate the voltage of the first power supply output signal PS1. This trade-off may be appropriate if a bandwidth of the first power supply output signal PS1 is low enough. Therefore, in one embodiment of the first power supply 12 illustrated in FIG. 10, the bandwidth of the first power supply output signal PS1 is less than about 10 megahertz.

Figure 11:
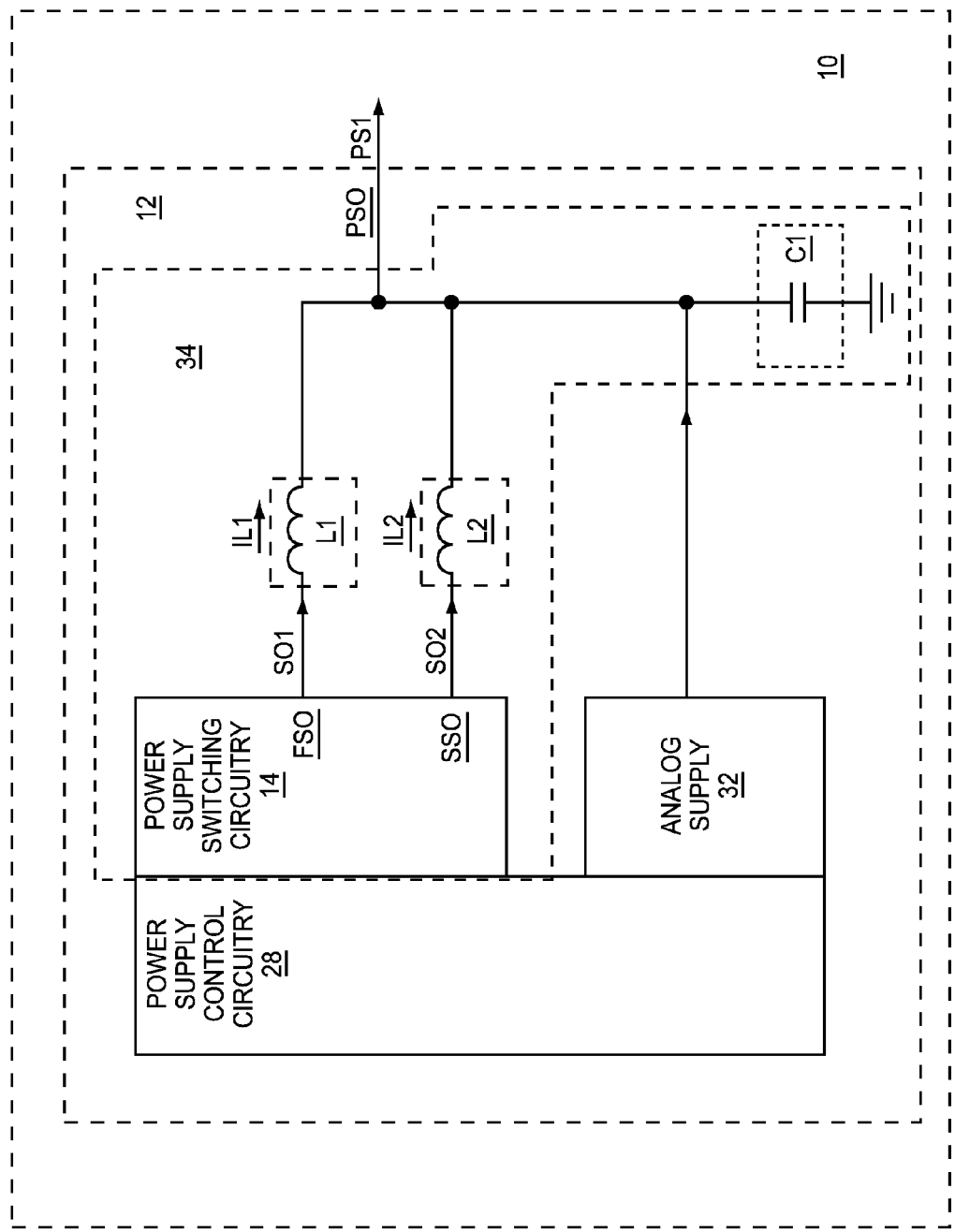
FIG. 11 shows the circuitry according to another embodiment of the circuitry.

FIG. 11 shows the circuitry 10 according to another embodiment of the circuitry 10. The circuitry 10 illustrated in FIG. 11 is similar to the circuitry 10 illustrated in FIG. 6, except in the circuitry 10 illustrated in FIG. 11, the first power supply 12 further includes an analog supply 32 and a switching supply 34. The analog supply 32 and the switching supply 34 are both coupled to one another and are coupled to the power supply control circuitry 28. The switching supply 34 includes the power supply switching circuitry 14, the first inductive element L1, the second inductive element L2, and a first capacitive element C1. The first capacitive element C1 is coupled between the power supply output PSO and a ground.

In one embodiment of the switching supply 34, the switching supply 34 at least partially provides the first power supply output signal PS1. In one embodiment of the analog supply 32, the analog supply 32 at least partially provides the first power supply output signal PS1. In one embodiment of the analog supply 32, the analog supply 32 regulates a voltage of the first power supply output signal PS1 based on a setpoint of the first power supply output signal PS1. In one embodiment of the switching supply 34, the switching supply 34 drives an output current from the analog supply 32 toward zero. In this regard, the analog supply 32 behaves like a voltage source and the switching supply 34 behaves like a current source.

The power supply control circuitry 28 controls the analog supply 32 and the switching supply 34. In one embodiment of the analog supply 32 and the switching supply 34, the analog supply 32 and the switching supply 34 provide the first power supply output signal PS1, such that the analog supply 32 partially provides the first power supply output signal PS1 and the switching supply 34 partially provides the first power supply output signal PS1. The switching supply 34 may provide power more efficiently than the analog supply 32. However, the analog supply 32 may provide the first power supply output signal PS1 more accurately than the switching supply 34. A voltage of the first power supply output signal PS1 is fairly smooth due to filtering by the first capacitive element C1 and voltage regulation by the analog supply 32.

Figure 12:
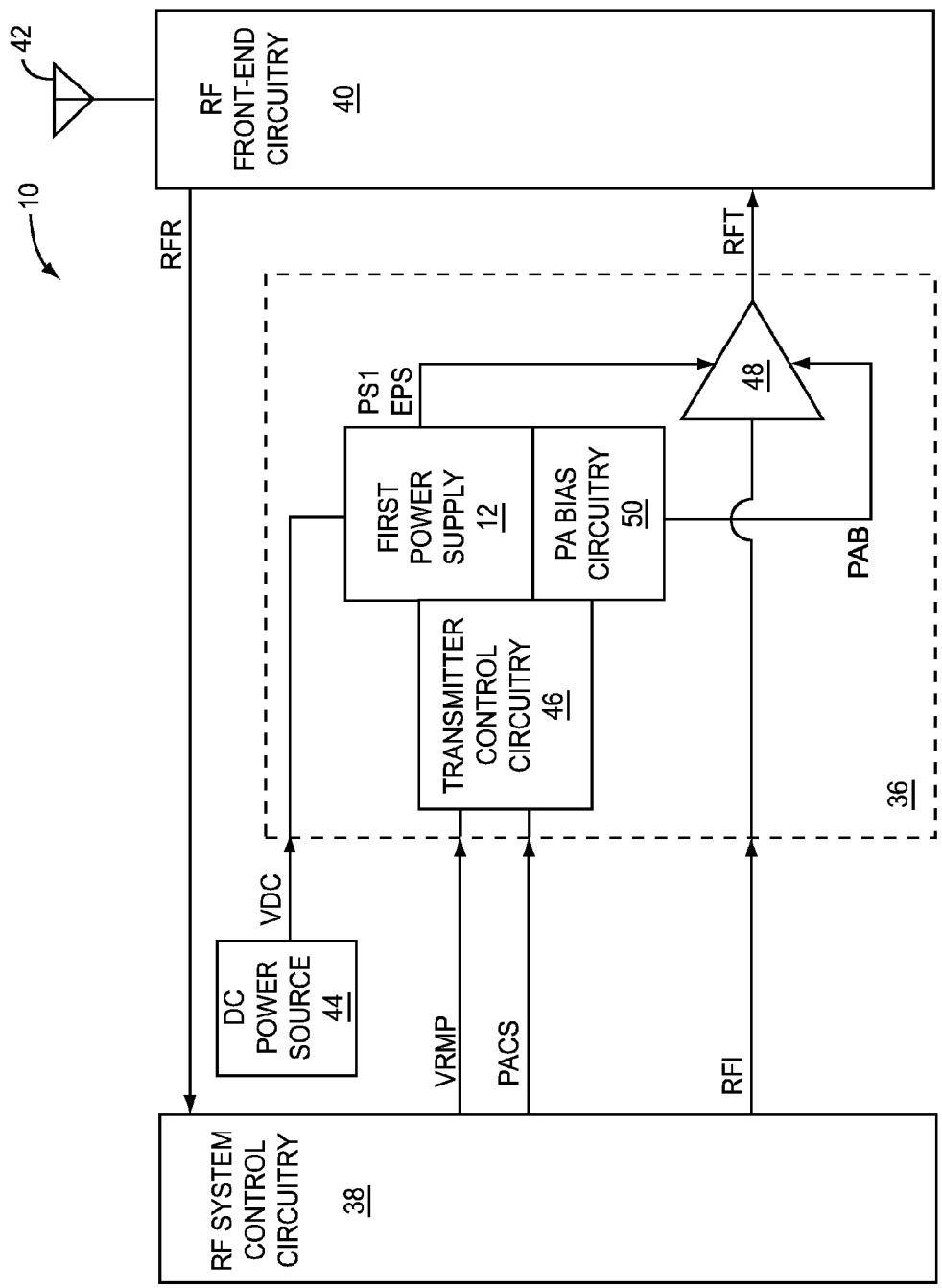
FIG. 12 shows the circuitry according to one embodiment of the circuitry.

FIG. 12 shows the circuitry 10 according to one embodiment of the circuitry 10. The circuitry 10 includes transmitter circuitry 36, RF system control circuitry 38, RF front-end circuitry 40, an RF antenna 42, and a DC power source 44. The RF transmitter circuitry 36 includes transmitter control circuitry 46, an RF power amplifier (PA) 48, the first power supply 12, and PA bias circuitry 50. In this regard, in one embodiment of the circuitry 10, the circuitry 10 illustrated in FIG. 12 is an RF communications system.

In one embodiment of the circuitry 10, the RF front-end circuitry 40 receives via the RF antenna 42, processes, and forwards an RF receive signal RFR to the RF system control circuitry 38. In one embodiment of the circuitry 10, the RF receive signal RFR has an RF receive frequency. Further, the power supply control circuitry 28 (FIG. 6) selects the switching signal delay 24 (FIGS. 2A and 2B), such that a frequency of one of the group of related notches 26 (FIGS. 3B and 3C) is about equal to the RF receive frequency, which may reduce noise in the receive path from the transmit path. The RF system control circuitry 38 provides an envelope power supply control signal VRMP and a transmitter configuration signal PACS to the transmitter control circuitry 46. The RF system control circuitry 38 provides an RF input signal RFI to the RF PA 48. The DC power source 44 provides a DC source signal VDC to the first power supply 12. In one embodiment of the DC power source 44, the DC power source 44 is a battery.

The transmitter control circuitry 46 is coupled to the first power supply 12 and to the PA bias circuitry 50. The first power supply 12 provides the first power supply output signal PS1 to the RF PA 48 based on the envelope power supply control signal VRMP. In this regard, the first power supply 12 is an envelope tracking power supply and the first power supply output signal PS1 is an envelope power supply signal EPS. The DC source signal VDC provides power to the first power supply 12. As such, the first power supply output signal PS1, which is the envelope power supply signal EPS, is based on the DC source signal VDC. The envelope power supply control signal VRMP is representative of a setpoint of the envelope power supply signal EPS. The RF PA 48 receives and amplifies the RF input signal RFI to provide an RF transmit signal RFT using the envelope power supply signal EPS. The envelope power supply signal EPS provides power for amplification.

In one embodiment of the first power supply 12, the envelope power supply signal EPS is amplitude modulated to at least partially provide envelope tracking. In one embodiment of the RF PA 48, the RF PA 48 operates with approximately constant gain, called isogain, and with gain compression. In a first embodiment of the gain compression, the gain compression is greater than about one decibel. In a second embodiment of the gain compression, the gain compression is greater than about two decibels. In a third embodiment of the gain compression, the gain compression is equal to about two decibels. In a fourth embodiment of the gain compression, the gain compression is equal to about three decibels. In a fifth embodiment of the gain compression, the gain compression is equal to about four decibels. By operating with higher levels of gain compression, efficiency of the RF PA 48 may be increased, which may help compensate for reduced efficiency in the first power supply 12.

In a first embodiment of the envelope power supply signal EPS, a bandwidth of the envelope power supply signal EPS is greater than or equal to about 10 megahertz. In a second embodiment of the envelope power supply signal EPS, a bandwidth of the envelope power supply signal EPS is less than or equal to about 10 megahertz. In a third embodiment of the envelope power supply signal EPS, a bandwidth of the envelope power supply signal EPS is greater than or equal to about 20 megahertz. In a fourth embodiment of the envelope power supply signal EPS, a bandwidth of the envelope power supply signal EPS is less than or equal to about 20 megahertz.

The RF front-end circuitry 40 receives, processes, and transmits the RF transmit signal RFT via the RF antenna 42. In one embodiment of the RF transmitter circuitry 36, the transmitter control circuitry 46 configures the RF transmitter circuitry 36 based on the transmitter configuration signal PACS. In one embodiment of the circuitry 10, the circuitry 10 operates in a full duplex environment, such that the RF transmit signal RFT and the RF receive signal RFR may be active simultaneously. The RF transmit signal RFT has an RF transmit frequency and the RF receive signal RFR has the RF receive frequency. A difference between the RF transmit frequency and the RF receive frequency is about equal to an RF duplex frequency. In one embodiment of the circuitry 10, the power supply control circuitry 28 (FIG. 6) selects the switching signal delay 24 (FIGS. 2A and 2B), such that a frequency of one of the group of related notches 26 (FIGS. 3B and 3C) is about equal to the RF duplex frequency, which may reduce noise in the receive path from the transmit path. In one embodiment of the RF duplex frequency, the RF duplex frequency is greater than or equal to about 50 megahertz.

The PA bias circuitry 50 provides a PA bias signal PAB to the RF PA 48. In this regard, the PA bias circuitry 50 biases the RF PA 48 via the PA bias signal PAB. In one embodiment of the PA bias circuitry 50, the PA bias circuitry 50 biases the RF PA 48 based on the transmitter configuration signal PACS. In one embodiment of the RF front-end circuitry 40, the RF front-end circuitry 40 includes at least one RF switch, at least one RF amplifier, at least one RF filter, at least one RF duplexer, at least one RF diplexer, at least one RF amplifier, the like, or any combination thereof. In one embodiment of the RF system control circuitry 38, the RF system control circuitry 38 is RF transceiver circuitry, which may include an RF transceiver IC, baseband controller circuitry, the like, or any combination thereof. In one embodiment of the RF transmitter circuitry 36, the first power supply 12 provides the envelope power supply signal EPS, which has switching ripple. In one embodiment of the RF transmitter circuitry 36, the envelope power supply signal EPS provides power for amplification and envelope tracks the RF transmit signal RFT.

Figure 13:
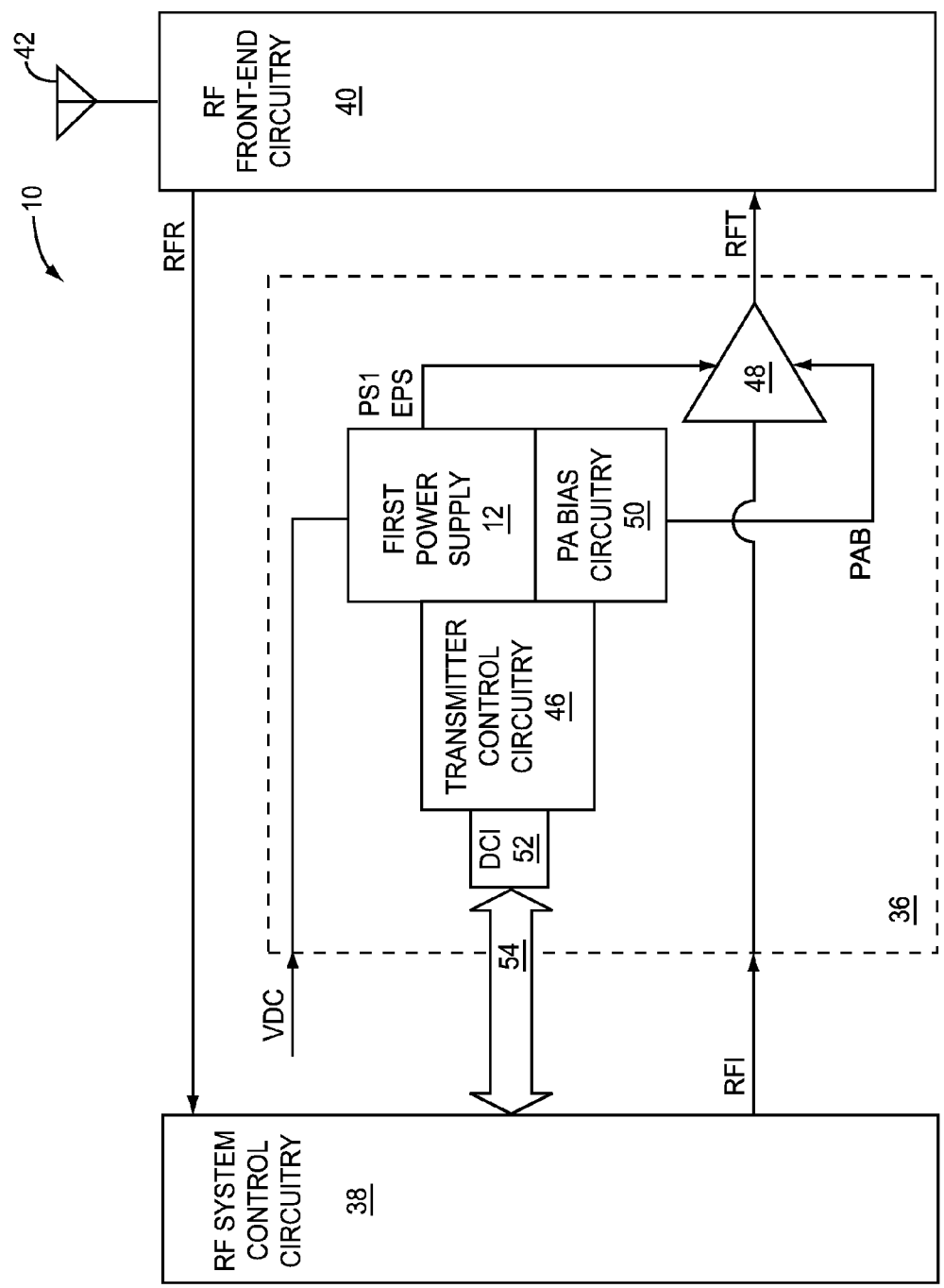
FIG. 13 shows the circuitry according to another embodiment of the circuitry.

FIG. 13 shows the circuitry 10 according to another embodiment of the circuitry 10. The circuitry 10 illustrated in FIG. 13 is similar to the circuitry 10 illustrated in FIG. 12, except in the circuitry 10 illustrated in FIG. 13, the RF transmitter circuitry 36 further includes a digital communications interface 52, which is coupled between the transmitter control circuitry 46 and a digital communications bus 54. The digital communications bus 54 is also coupled to the RF system control circuitry 38. As such, the RF system control circuitry 38 provides the envelope power supply control signal VRMP (FIG. 12) and the transmitter configuration signal PACS (FIG. 12) to the transmitter control circuitry 46 via the digital communications bus 54 and the digital communications interface 52.

Figure 14:
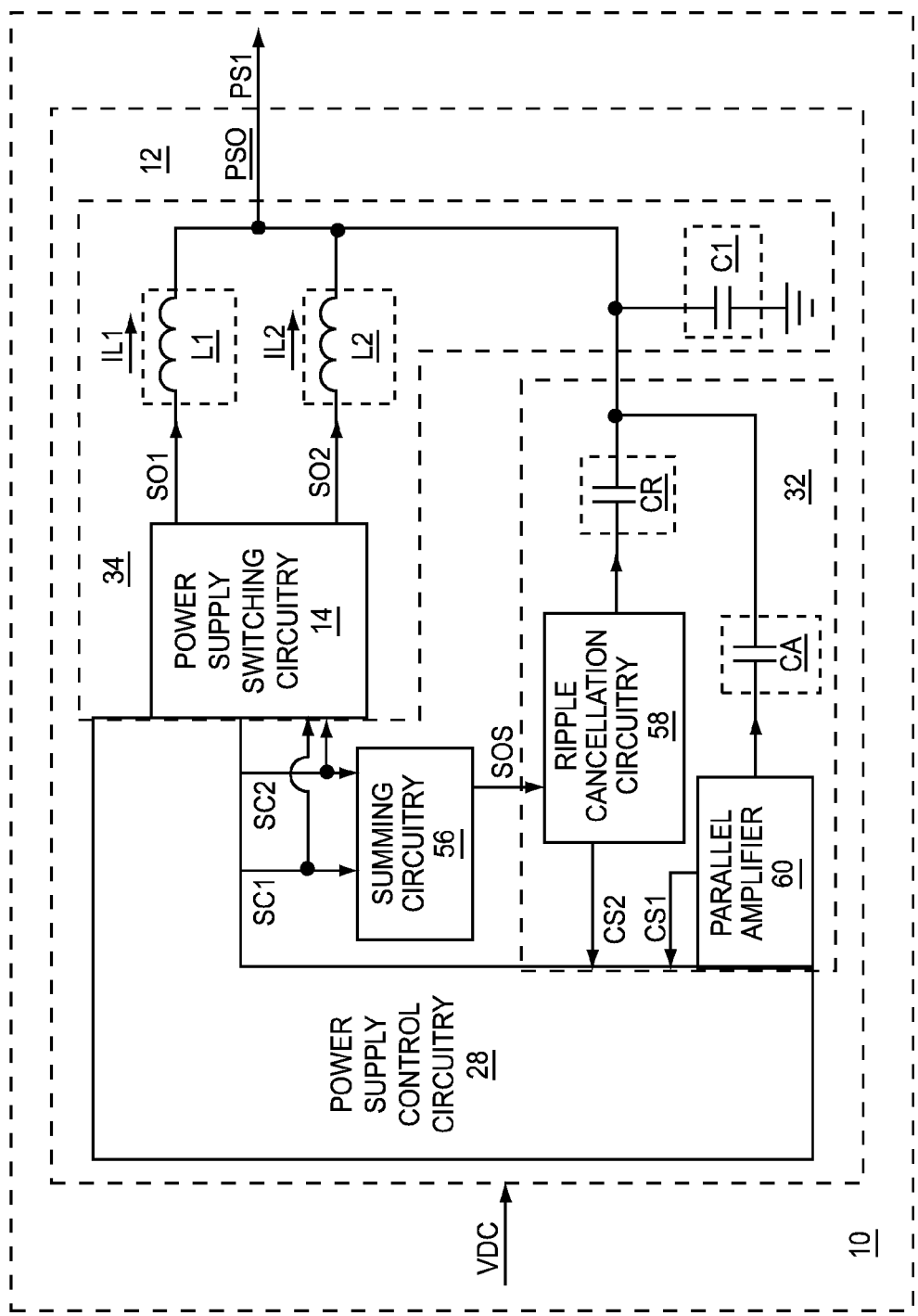
FIG. 14 shows the circuitry according to an additional embodiment of the circuitry.

FIG. 14 shows the circuitry 10 according to an additional embodiment of the circuitry 10. The first power supply 12 illustrated in FIG. 14 is similar to the first power supply 12 illustrated in FIG. 11, except the first power supply 12 illustrated in FIG. 14 further includes summing circuitry 56, and the analog supply 32 includes ripple cancellation circuitry 58, a parallel amplifier 60, a ripple circuit offset capacitive element CR, and a parallel amplifier offset capacitive element CA.

The first power supply 12 receives the DC source signal VDC. The parallel amplifier offset capacitive element CA is coupled between the parallel amplifier 60 and the power supply output PSO. During operation, the parallel amplifier offset capacitive element CA may have an offset voltage. This offset voltage may allow the parallel amplifier 60 to function properly even if a voltage of the first power supply output signal PS1 is greater than a voltage of the DC source signal VDC. The parallel amplifier 60 provides a first current sense signal CS1 to the power supply control circuitry 28. The first current sense signal CS1 is indicative of an output current from the parallel amplifier 60. In an alternate embodiment of the analog supply 32, the parallel amplifier offset capacitive element CA is omitted. In another embodiment of the analog supply 32, both the parallel amplifier 60 and the parallel amplifier offset capacitive element CA are omitted.

The ripple circuit offset capacitive element CR is coupled between the ripple cancellation circuitry 58 and the power supply output PSO. During operation, the ripple circuit offset capacitive element CR may have an offset voltage. This offset voltage may allow the ripple cancellation circuitry 58 to function properly even if a voltage of the first power supply output signal PS1 is greater than a voltage of the DC source signal VDC. The ripple cancellation circuitry 58 provides a second current sense signal CS2 to the power supply control circuitry 28. The second current sense signal CS2 is indicative of an output current from the ripple cancellation circuitry 58. In an alternate embodiment of the analog supply 32, the ripple circuit offset capacitive element CR is omitted. In another embodiment of the analog supply 32, both the ripple cancellation circuitry 58 and the ripple circuit offset capacitive element CR are omitted.

The power supply control circuitry 28 provides a first switching control signal SC1 and a second switching control signal SC2 to both the power supply switching circuitry 14 and the summing circuitry 56. The power supply switching circuitry 14 provides the first switching output signal SO1 based on the first switching control signal SC1 and provides the second switching output signal SO2 based on the second switching control signal SC2. As such, the first inductor current IL1 and the second inductor current IL2 are based on the first switching control signal SC1 and the second switching control signal SC2, respectively. The summing circuitry 56 receives and sums the first switching control signal SC1 and the second switching control signal SC2 to provide a summing output signal SOS to the ripple cancellation circuitry 58. In this regard, the ripple cancellation circuitry 58 at least partially cancels ripple current from the first inductive element L1 and the second inductive element L2 based on the first switching control signal SC1 and the second switching control signal SC2. Specifically, the ripple cancellation circuitry 58 at least partially cancels ripple current from the combined inductor current ILC (FIG. 1) using the first switching control signal SC1 and the second switching control signal SC2.

In one embodiment of the switching supply 34, the switching supply 34 operates to drive the output current from the analog supply 32 toward zero to maximize efficiency based on both the first current sense signal CS1 and the second current sense signal CS2. Specifically, the switching supply 34 operates to drive the output current from the ripple cancellation circuitry 58 toward zero based on the second current sense signal CS2. Further, the switching supply 34 operates to drive the output current from the parallel amplifier 60 toward zero based on the first current sense signal CS1.

The power supply control circuitry 28 is coupled to and controls the parallel amplifier 60 and the power supply switching circuitry 14. The parallel amplifier 60 and the switching supply 34 provide the first power supply output signal PS1, such that the parallel amplifier 60 partially provides the first power supply output signal PS1 and the switching supply 34 partially provides the first power supply output signal PS1. In one embodiment of the parallel amplifier 60, the parallel amplifier 60 at least partially provides the first power supply output signal PS1. In one embodiment of the switching supply 34, the switching supply 34 at least partially provides the first power supply output signal PS1.

The switching supply 34 may provide power more efficiently than the parallel amplifier 60. However, the parallel amplifier 60 may provide the first power supply output signal PS1 more accurately than the switching supply 34. As such, the parallel amplifier 60 regulates the voltage of the first power supply output signal PS1 based on the setpoint of the first power supply output signal PS1. The switching supply 34 operates to drive the output current from the analog supply 32 toward zero to maximize efficiency based on the first current sense signal CS1. In this regard, the parallel amplifier 60 behaves like a voltage source and the switching supply 34 behaves like a current source.

Figure 15:
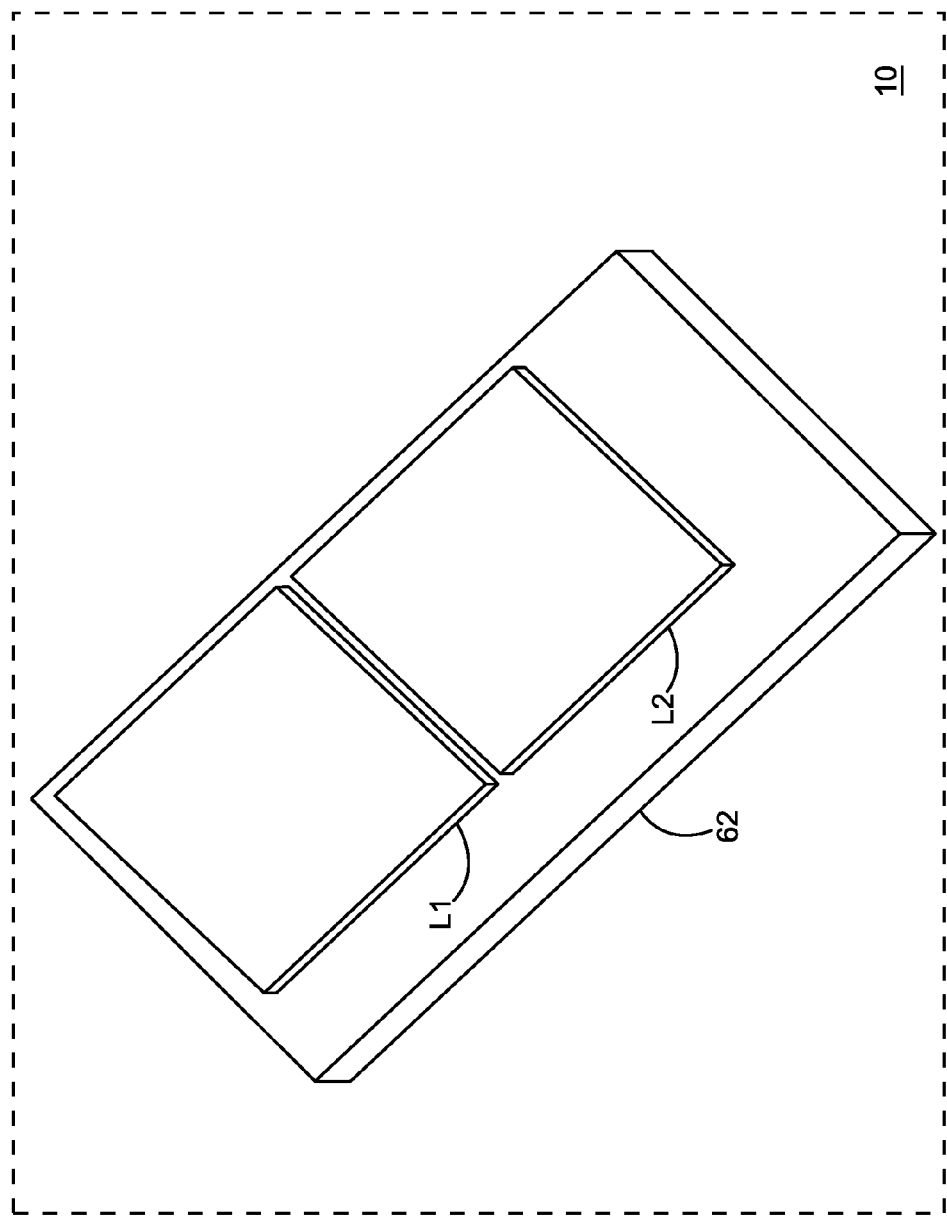
FIG. 15 shows the circuitry according to one embodiment of the circuitry.

FIG. 15 shows the circuitry 10 according to one embodiment of the circuitry 10. The circuitry 10 illustrated in FIG. 15 further includes packaging 62, which includes the first inductive element L1 and the second inductive element L2 according to one embodiment of the packaging 62. In one embodiment of the packaging 62, the packaging 62 is fabricated, such that the first inductive element L1 and the second inductive element L2 are closely matched to one another. As such, the first inductive element L1 and the second inductive element L2 may be closely matched to one another over process, over temperature, or both. In this regard, the first inductive element L1 and the second inductive element L2 may have similar size, may have similar construction, may include similar construction materials, may be physically close to one another, or any combination thereof.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the embodiments of the present disclosure. All such improvements and modifications are considered within the scope of the concepts disclosed herein and the claims that follow.

What is claimed is:

1. Circuitry comprising:
a power supply output; and
power supply switching circuitry adapted to provide:
a first switching output signal to a first inductive element; and
a second switching output signal to a second inductive element, such that the second switching output signal is delayed from the first switching output signal by a switching signal delay, wherein:
the first inductive element is coupled between the power supply switching circuitry and the power supply output;
the second inductive element is coupled between the power supply switching circuitry and the power supply output;
the first inductive element is adapted to have a first inductor current; and
the second inductive element is adapted to have a second inductor current, such that the first inductor current and the second inductor current combine to provide a combined inductor current, which has a frequency response with a plurality of notches, such that frequency locations of the plurality of notches are based on the switching signal delay.

2. The circuitry of claim 1 wherein a waveshape of the second switching output signal is about equal to a waveshape of the first switching output signal.

3. The circuitry of claim 1 wherein an inductance of the second inductive element is about equal to an inductance of the first inductive element.

4. The circuitry of claim 1 further comprising power supply control circuitry adapted to select the switching signal delay.

5. The circuitry of claim 4 wherein the switching signal delay is selected, such that a frequency of one of the plurality of notches is about equal to a radio frequency (RF) receive frequency.

6. The circuitry of claim 4 wherein the switching signal delay is selected, such that a frequency of one of the plurality of notches is about equal to a radio frequency (RF) duplex frequency, which is about equal to a difference between an RF transmit frequency and an RF receive frequency.

7. The circuitry of claim 6 wherein the RF duplex frequency is greater than or equal to about 50 megahertz.

8. The circuitry of claim 1 further comprising a first capacitive element, such that:
a first power supply has the power supply output, the power supply switching circuitry, the first inductive element, the second inductive element, and the first capacitive element;
the first capacitive element is coupled between the power supply output and a ground; and the first power supply is adapted to provide a first power supply output signal via the power supply output based on the combined inductor current.

9. The circuitry of claim 8 wherein the first power supply output signal is an envelope power supply signal.

10. The circuitry of claim 9 wherein the envelope power supply signal is amplitude modulated to at least partially provide envelope tracking.

11. The circuitry of claim 10 wherein a bandwidth of the envelope power supply signal is greater than or equal to about 10 megahertz.

12. The circuitry of claim 10 wherein a bandwidth of the envelope power supply signal is greater than or equal to about 20 megahertz.

13. The circuitry of claim 9 wherein an RF power amplifier is adapted to receive and amplify an RF input signal to provide an RF transmit signal using the envelope power supply signal, which provides power for amplification.

14. The circuitry of claim 13 wherein the RF power amplifier is further adapted to operate with approximately constant gain and with gain compression, such that the gain compression is greater than about one decibel.

15. The circuitry of claim 14 wherein the gain compression is equal to about two decibels.

16. The circuitry of claim 14 wherein the gain compression is equal to about three decibels.

17. The circuitry of claim 8 further comprising an analog supply, such that:
the first power supply further comprises a switching supply and the analog supply;
the switching supply comprises the power supply switching circuitry, the first inductive element, the second inductive element, and the first capacitive element;
the switching supply is adapted to at least partially provide the first power supply output signal;
the analog supply is adapted to at least partially provide the first power supply output signal;
the analog supply is adapted to regulate a voltage of the first power supply output signal based on a setpoint of the first power supply output signal; and
the switching supply is adapted to drive an output current from the analog supply toward zero.

18. The circuitry of claim 17 wherein:
the analog supply comprises a parallel amplifier;
the parallel amplifier is adapted to at least partially provide the first power supply output signal;
the parallel amplifier is further adapted to regulate the voltage of the first power supply output signal based on the setpoint of the first power supply output signal; and
the switching supply is further adapted to drive an output current from the parallel amplifier toward zero.

19. The circuitry of claim 18 wherein:
the first power supply further comprises power supply control circuitry adapted to:
select the switching signal delay;
provide a first switching control signal, such that the first switching output signal is based on the first switching control signal; and
provide a second switching control signal, such that the second switching output signal is based on the second switching control signal;
the analog supply further comprises ripple cancellation circuitry;
the ripple cancellation circuitry is adapted to at least partially cancel ripple current from the combined inductor current using the first switching control signal and the second switching control signal; and
the switching supply is further adapted to drive an output current from the ripple cancellation circuitry toward zero.

20. The circuitry of claim 1 wherein the switching signal delay is greater than or equal to about 2 nanoseconds.

21. The circuitry of claim 1 wherein the switching signal delay is less than or equal to about 15 nanoseconds.

22. The circuitry of claim 21 wherein a period of the first switching output signal is greater than about 50 nanoseconds.

23. The circuitry of claim 21 wherein a period of the first switching output signal is greater than about 100 nanoseconds.

24. The circuitry of claim 21 wherein a period of the first switching output signal is greater than about 150 nanoseconds.

25. The circuitry of claim 1 further comprising packaging, which comprises the first inductive element and the second inductive element, such that the first inductive element and the second inductive element are closely matched to one another.

26. Circuitry comprising:
power supply switching circuitry adapted to provide:
a first switching output signal to a first inductive element; and
a second switching output signal to a second inductive element, such that the second switching output signal is delayed from the first switching output signal by a switching signal delay;
the first inductive element adapted to have a first inductor current; and
the second inductive element adapted to have a second inductor current, such that the first inductor current and the second inductor current combine to provide a combined inductor current, which has a frequency response with a plurality of notches, such that frequency locations of the plurality of notches are based on the switching signal delay.

27. A method comprising:
providing a first switching output signal to a first inductive element, which has first inductor current;
providing a second switching output signal to a second inductive element, which has a second inductor current;
delaying the second switching output signal from the first switching output signal by a switching signal delay; and
combining the first inductor current and the second inductor current to provide a combined inductor current, which has a frequency response with a plurality of notches, such that frequency locations of the plurality of notches are based on the switching signal delay.

* * * * *

UNITED STATES PATENT AND TRADEMARK OFFICE
CERTIFICATE OF CORRECTION

PATENT NO. : 9,250,643 B2
APPLICATION NO. : 13/689940
DATED : February 2, 2016
INVENTOR(S) : Nadim Khlat It is certified that error appears in the above-identified patent and that said Letters Patent is hereby corrected as shown below:

In the Specification:

In column 4, line 39, replace "502" with --SO2--.

In column 4, lines 43 and 46, replace "501" with --SO1--.

In column 6, line 62, replace "501" with --SO1--.

In column 7, lines 34 and 37, replace "501" with --SO1--.

In column 8, line 53, replace "502" with --SO2--.

In column 8, lines 58, 63, and 65, replace "501" with --SO1--.

Signed and Sealed this
Twelfth Day of April, 2016

Michelle K. Lee
*Director of the United States Patent and Trademark Office*